United States Patent
McNelley et al.

(10) Patent No.: US 6,243,130 B1
(45) Date of Patent: *Jun. 5, 2001

(54) INTEGRATED REFLECTED DISPLAY TELECONFERENCING EYE CONTACT TERMINAL

(76) Inventors: Steve H. McNelley, 29677 Wood Lake Ct., San Juan Capistrano, CA (US) 92675; Jeffrey S. Machtig, 22921 Mullin Rd., Lake Forest, CA (US) 92630-2943

(*) Notice: Subject to any disclaimer, the term of this patent is extended or adjusted under 35 U.S.C. 154(b) by 0 days.

This patent is subject to a terminal disclaimer.

(21) Appl. No.: 09/262,974

(22) Filed: Mar. 5, 1999

Related U.S. Application Data

(63) Continuation-in-part of application No. 09/107,476, filed on Jul. 1, 1998, now Pat. No. 5,953,052, which is a continuation-in-part of application No. 08/530,880, filed on Sep. 20, 1995, now Pat. No. 5,777,665.

(51) Int. Cl.[7] .................................................. H04N 7/12
(52) U.S. Cl. .............................. 348/20; 348/14; 313/478; 359/296
(58) Field of Search .................................. 348/14, 15, 20, 348/335, 835, 834; 359/296; 313/478, 474

(56) References Cited

U.S. PATENT DOCUMENTS 5,953,052 * 9/1999 McNelley .............................. 348/20

* cited by examiner

Primary Examiner—Wing F. Chan
(74) Attorney, Agent, or Firm—Hogan & Hartson, L.L.P.

(57) ABSTRACT

The present invention enables eye contact between conferees during a teleconference using a terminal equipped with a beamsplitter for reflecting an image of a video display so that only the reflection and not a direct view of the display is seen by the conferee. The camera is positioned behind the viewing side of the beamsplitter to capture the conferee's image through the beamsplitter. The direct view of the display is blocked by an image blocking film applied between the beamsplitter and the display. Blocking the direct view of the video display greatly improves teleconferencing by eliminating the distraction of simultaneously viewing both the video display and the reflection of the display. The present invention also substantially improves available desktop space, functional options by providing a direct view and a reflected view of the display, and portability. Also, the present invention is an integrated device operating as a fully functional personal computer with a module bay which receives a videoconferencing module to enable a videoconference. The integrated terminal is also uniquely configured for both a single user mode and a group videoconferencing mode.

61 Claims, 20 Drawing Sheets

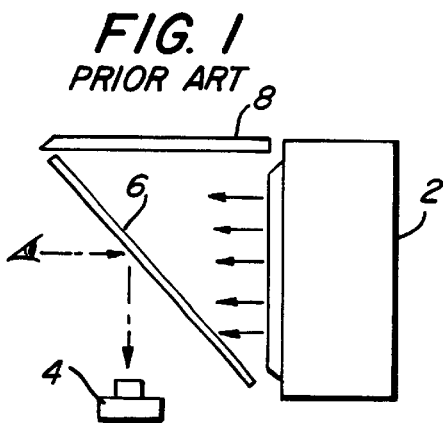
FIG. 1
PRIOR ART
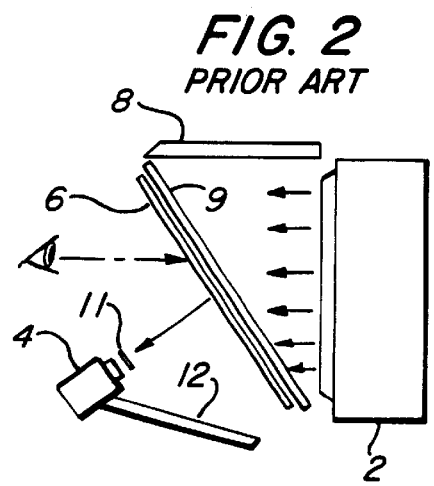
FIG. 2
PRIOR ART
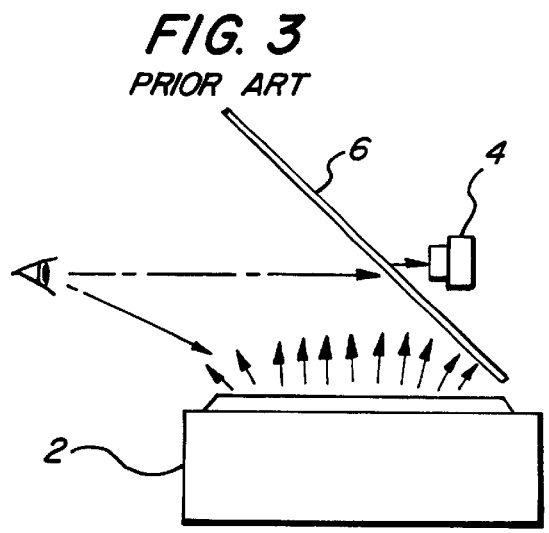
FIG. 3
PRIOR ART
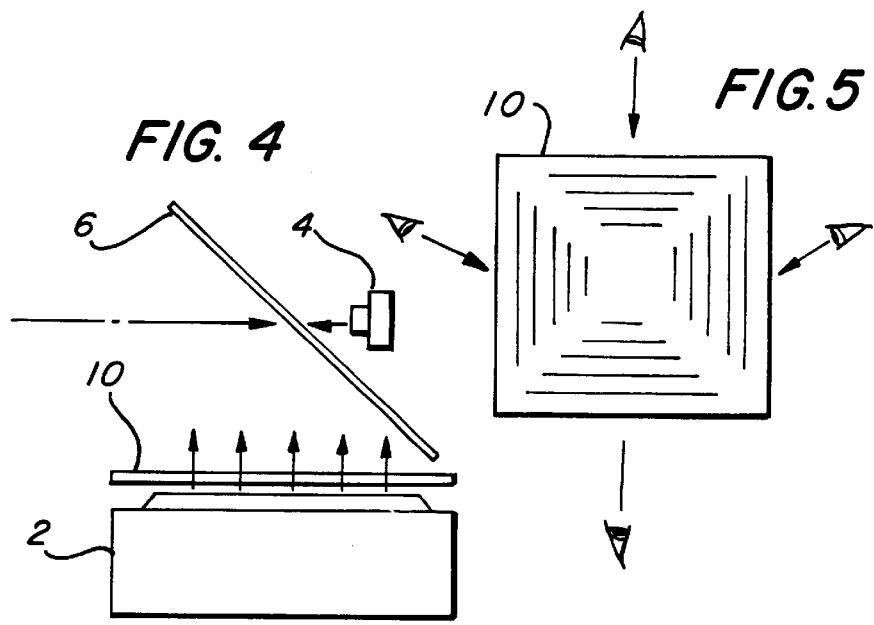
FIG. 4
FIG. 5

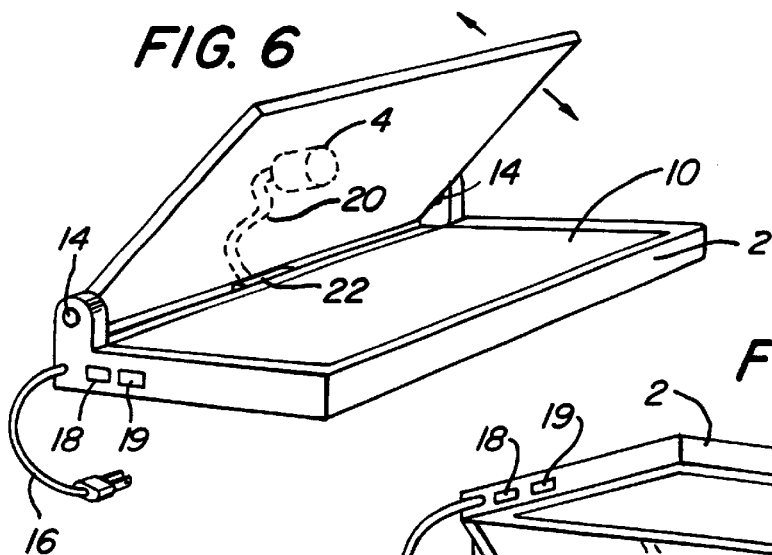
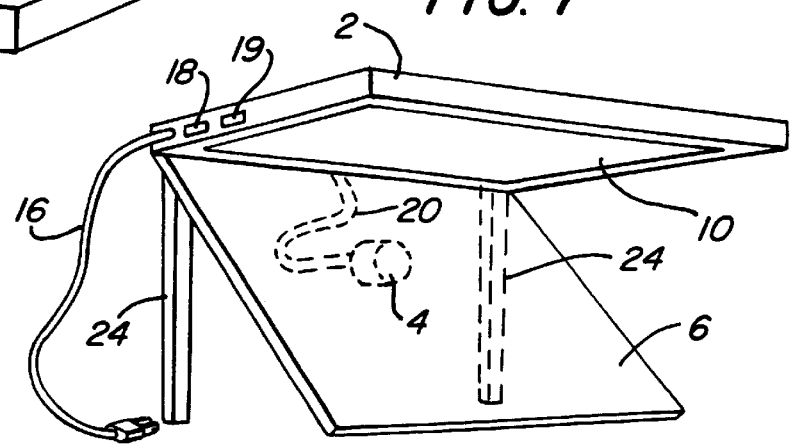
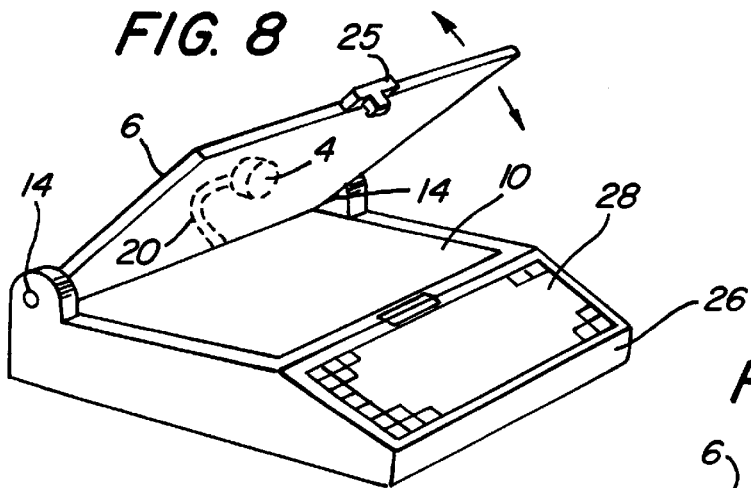
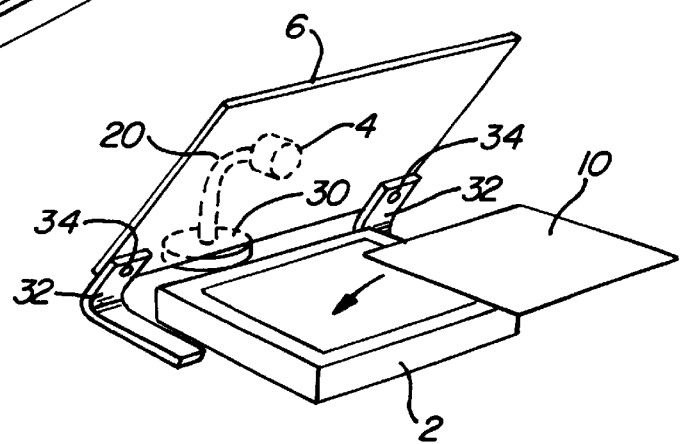

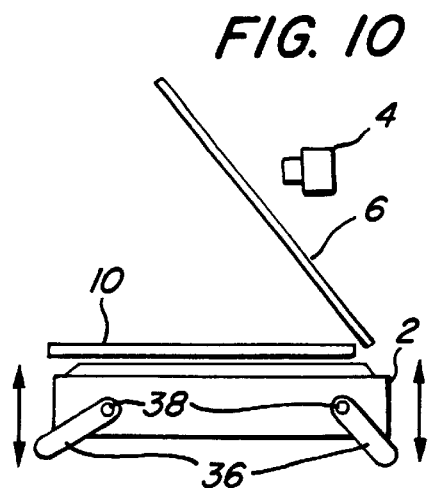
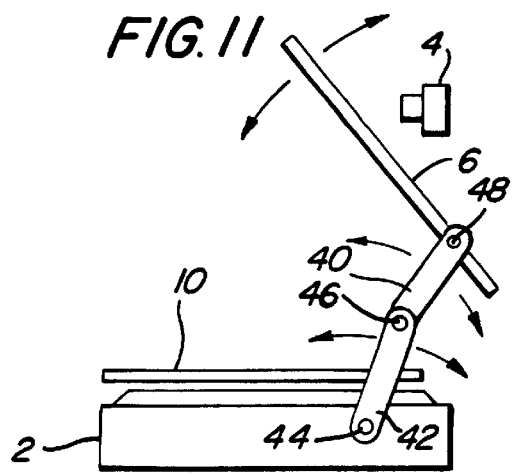
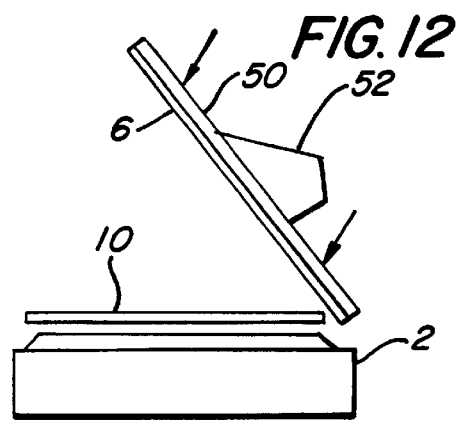
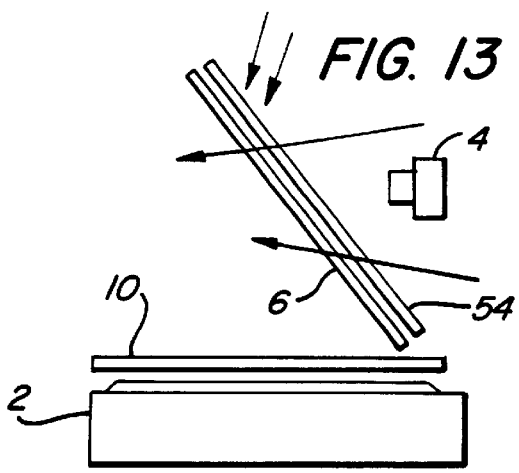
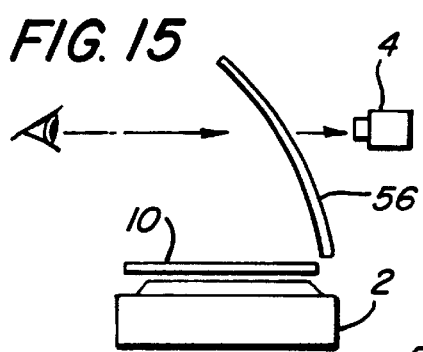
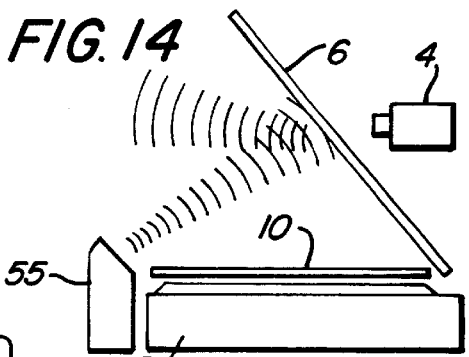
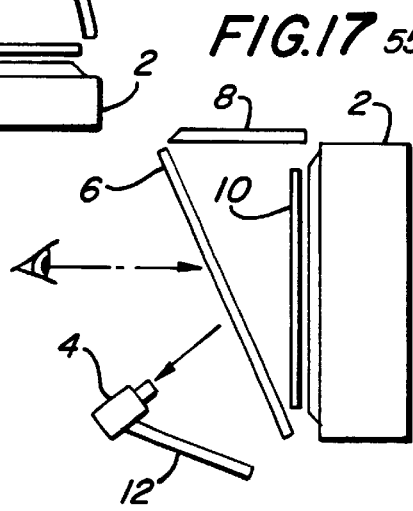
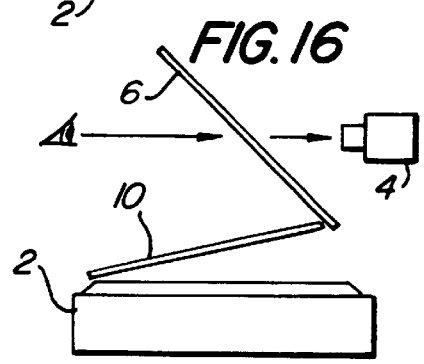

FIG. 22
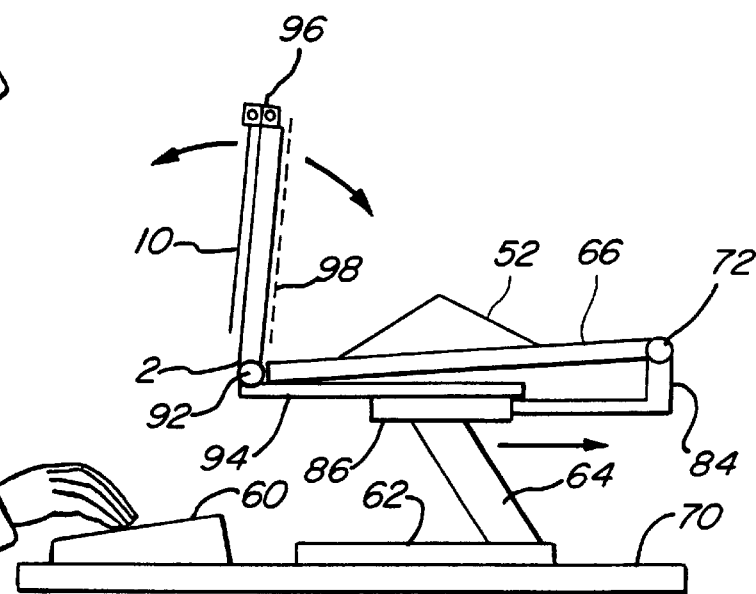
FIG. 23
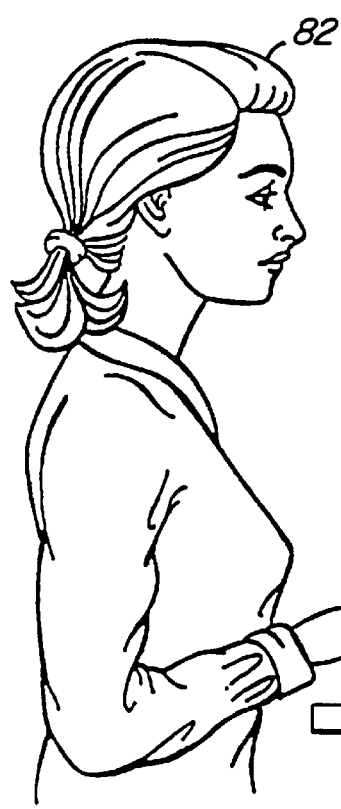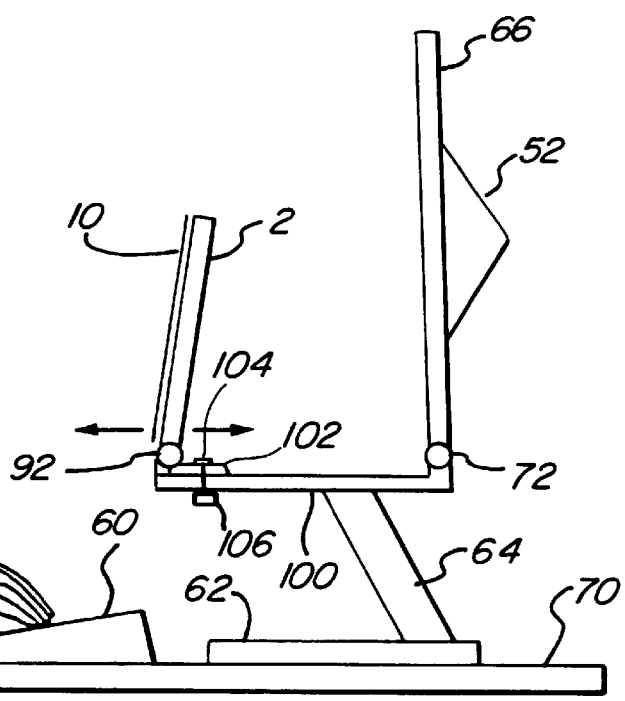

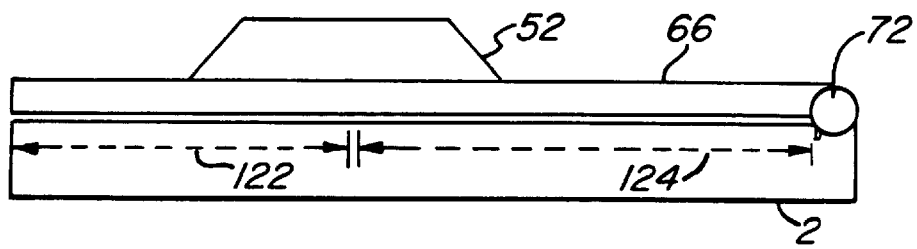
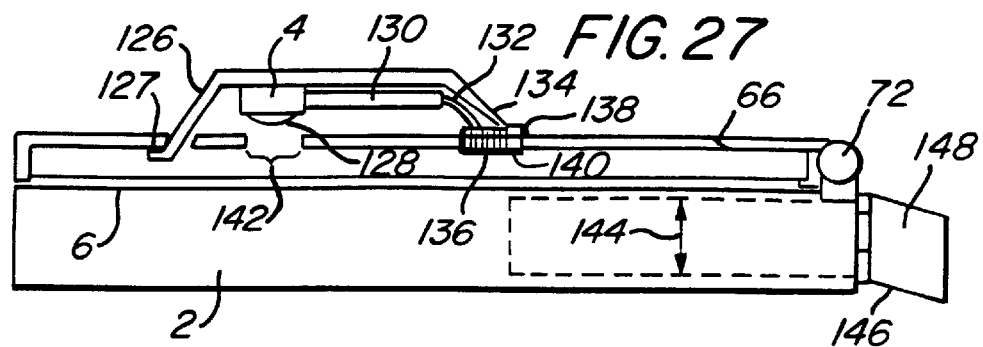
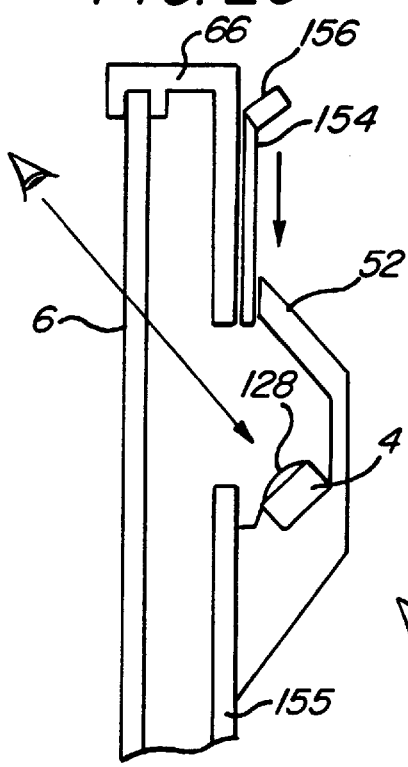
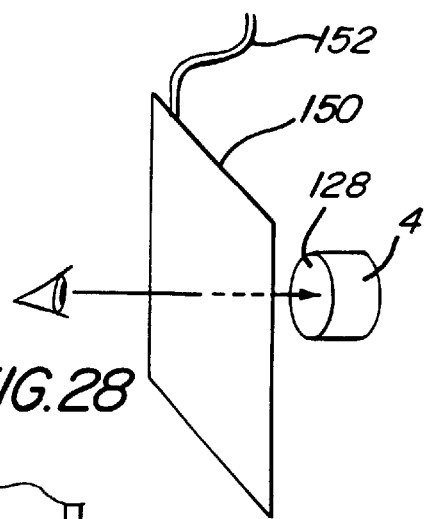
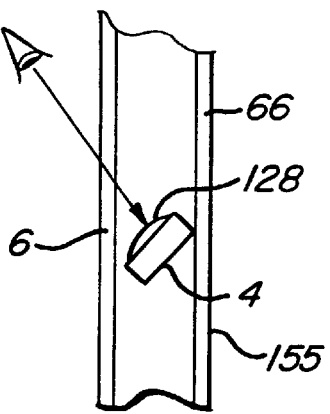

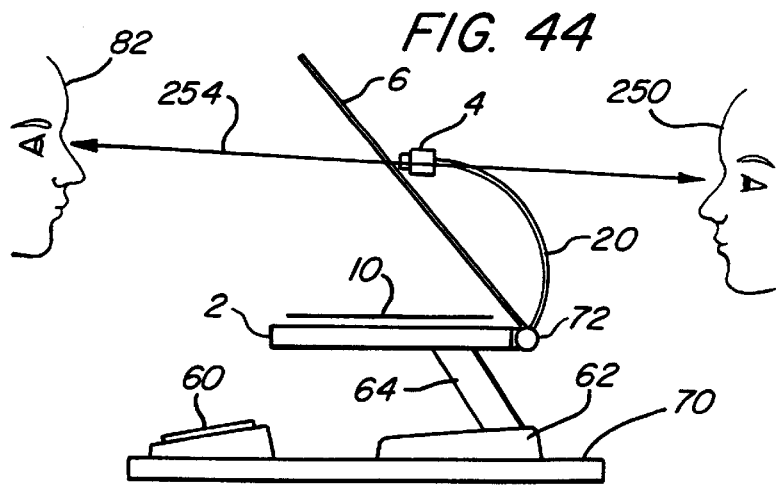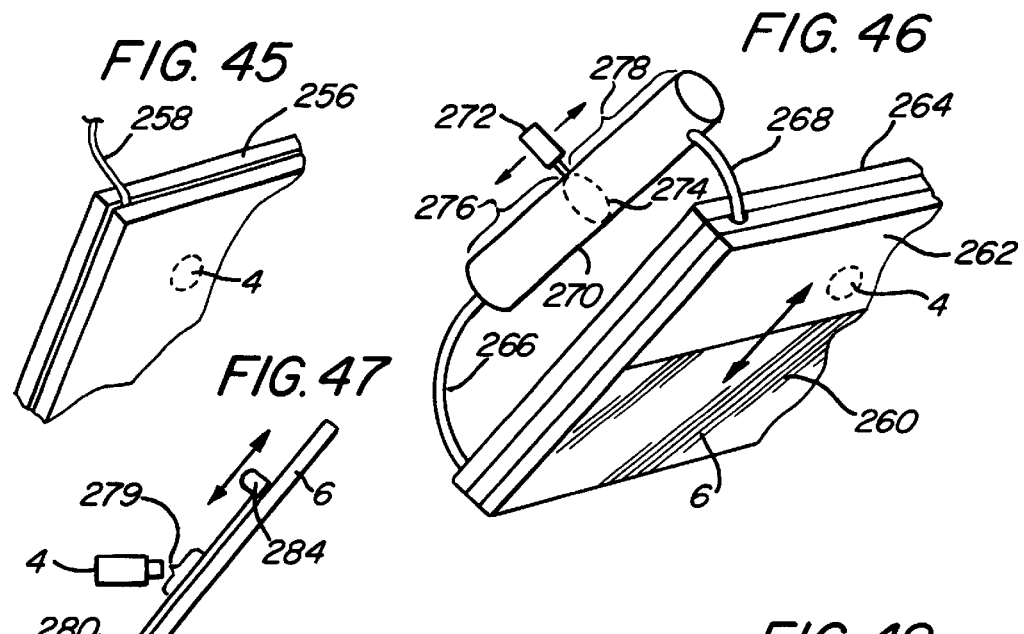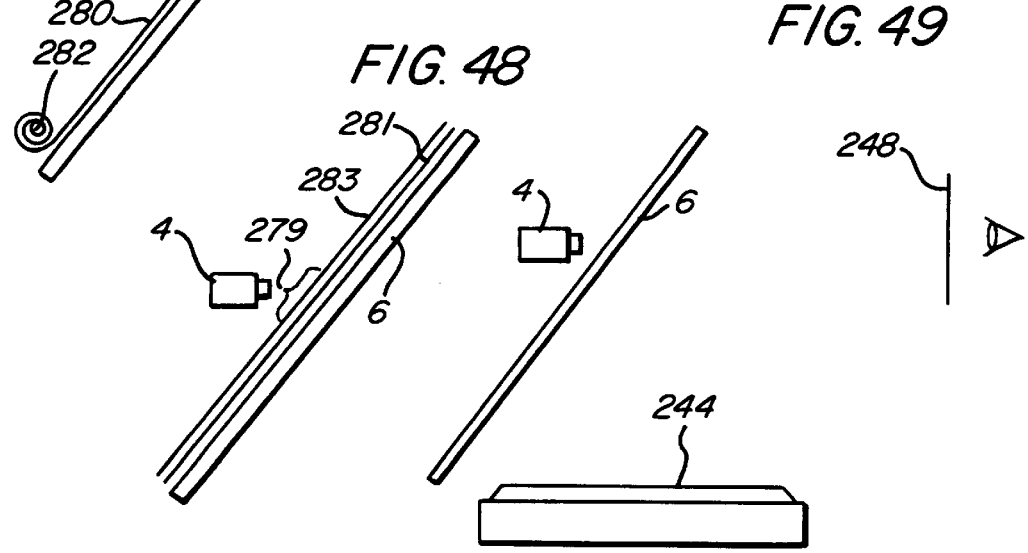

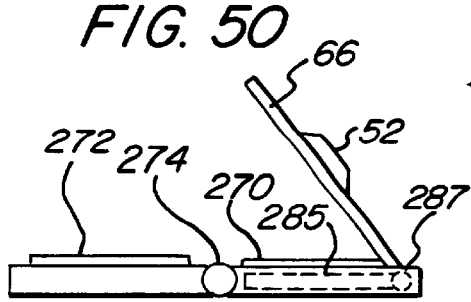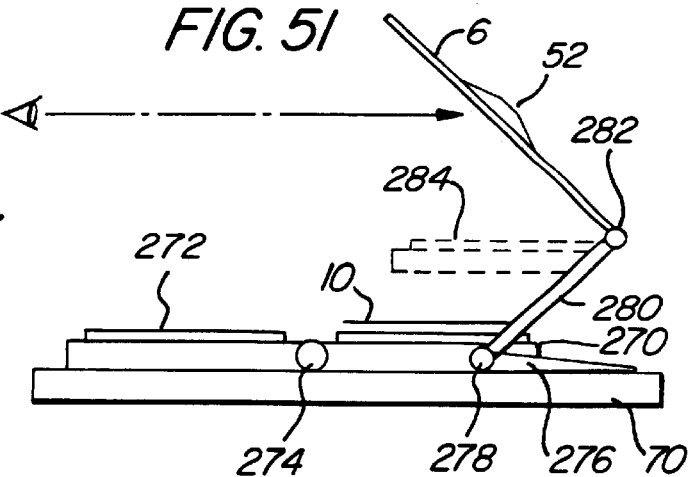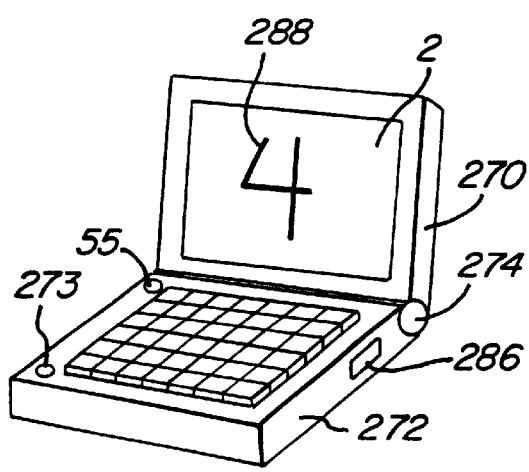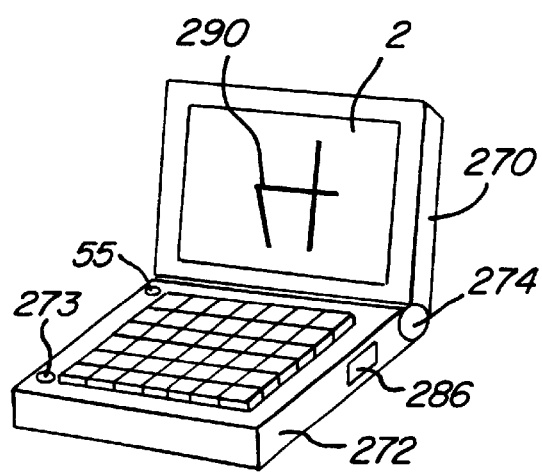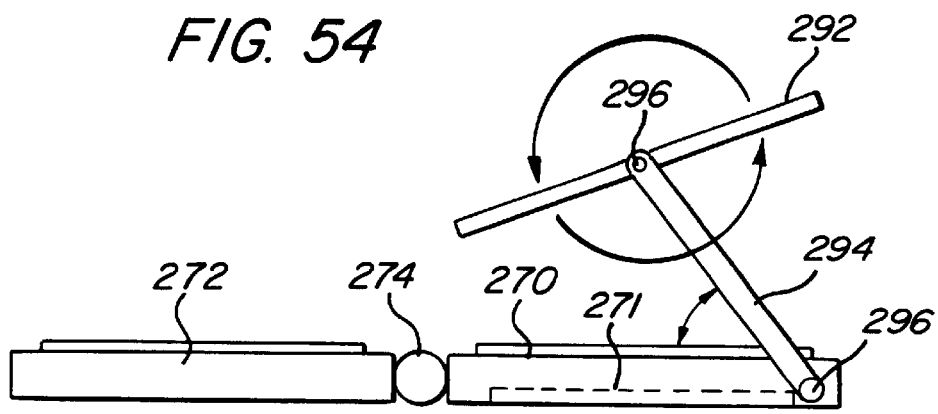

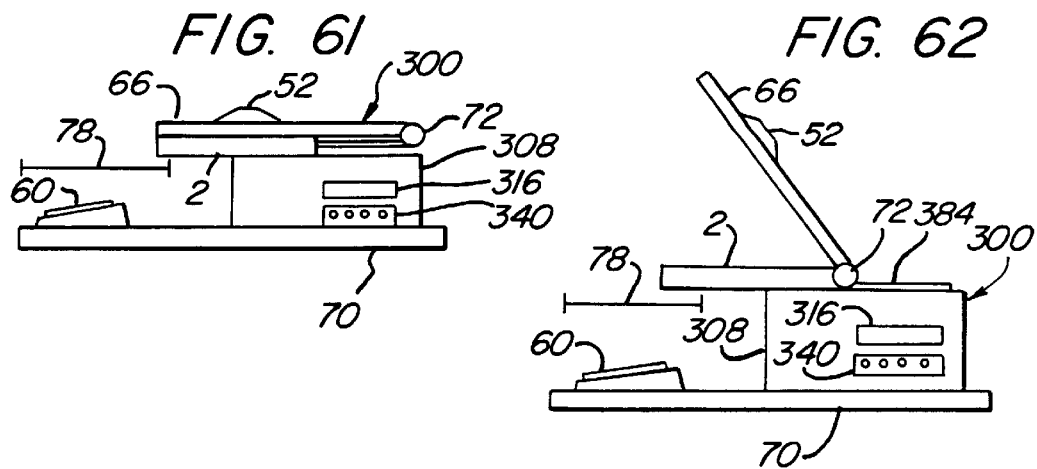
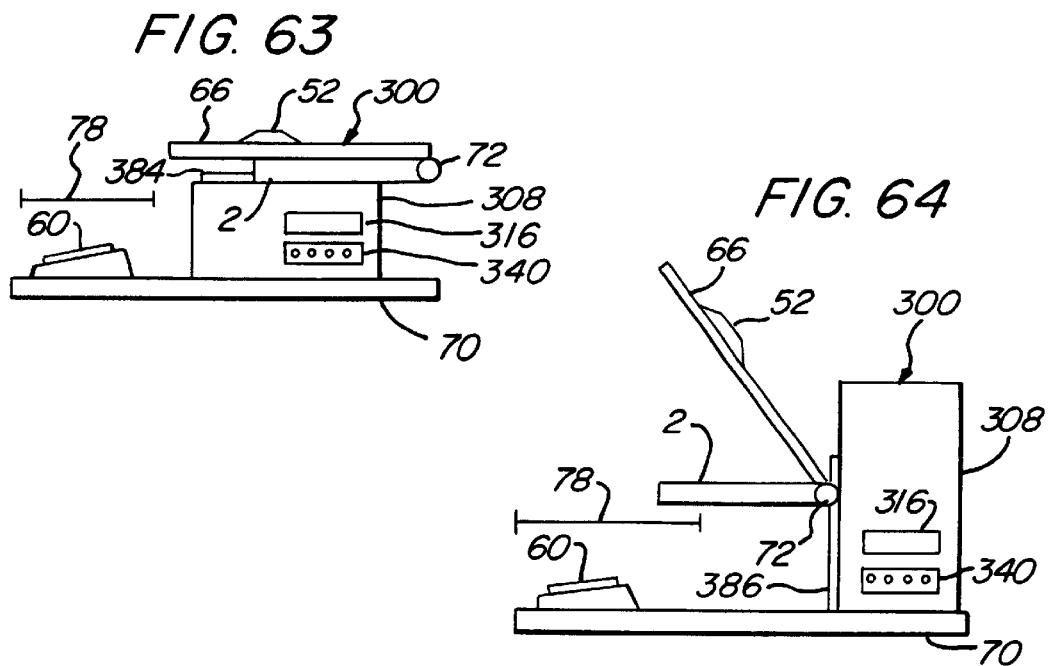
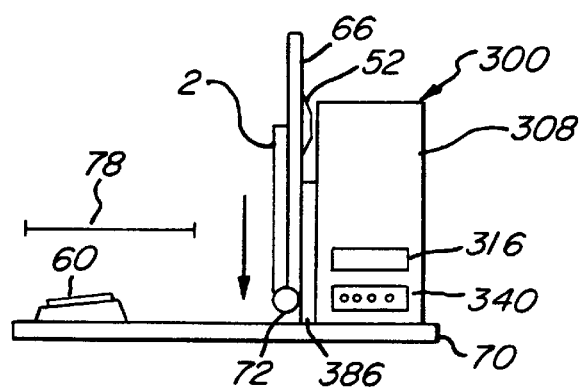

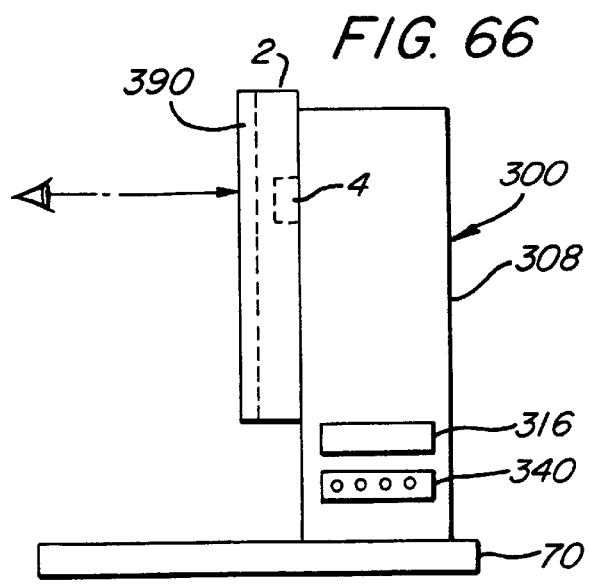
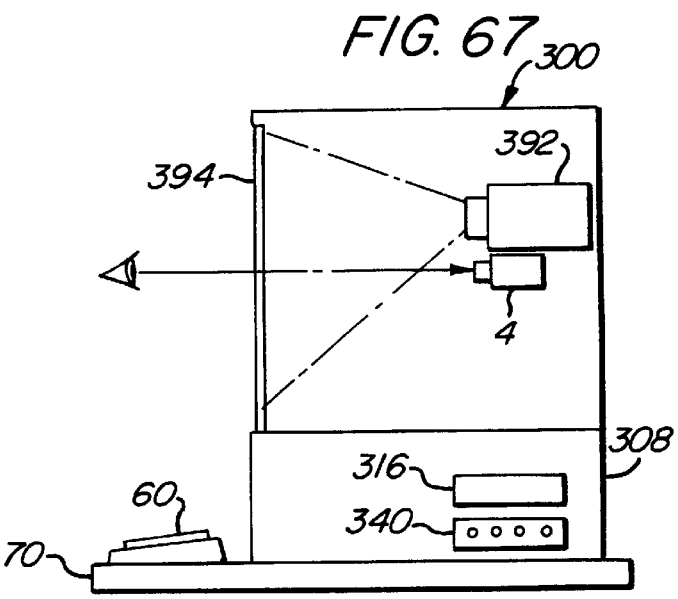
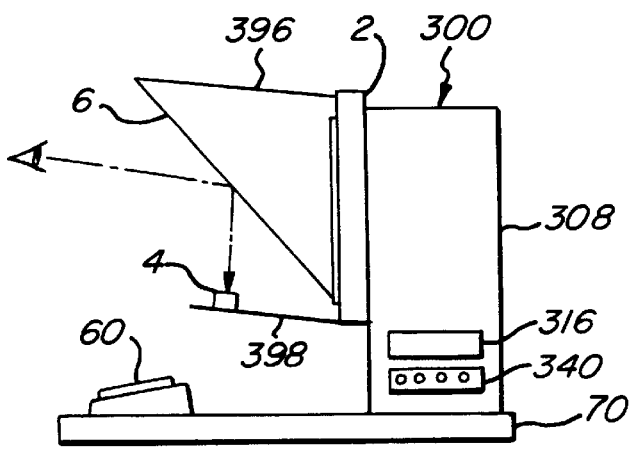

INTEGRATED REFLECTED DISPLAY TELECONFERENCING EYE CONTACT TERMINAL

The present application is a Continuation In Part of application Ser. No. 09/108,476, filed Jul. 1, 1998, now U.S. Pat. No. 5,953,052 which is a Continuation In Part of Ser. No. 08/530,880, filed on Sep. 20, 1995, and now issued as U.S. Pat. No. 5,777,665 which applications are hereby incorporated by reference into this application.

BACKGROUND OF THE INVENTION

1. Field of the Invention

The present invention concerns the area of teleconferencing and, more specifically, an improved video teleconferencing device that permits eye contact.

2. Description of Related Art

A primary concern in video-teleconferencing ergonomics is a lack of eye contact between conferees. Eye contact is not possible with common terminal configurations, because the camera is placed at the perimeter of the display that images a distant conferee, so that the camera does not interfere with a local conferee's viewing of the display. With this configuration the conferees fail to look directly into the camera, which results in the appearance of the conferees looking away and appearing disinterested in the conversation.

Although numerous technologies have been proposed to correct the eye contact problem, many of these technologies suffer from poor image capture quality, poor image display quality, excessive expense, or unacceptably increased terminal bulk. One commonly used component in eye contact systems is a beamsplitter. A beamsplitter is a semireflective transparent panel sometimes called a one way mirror or a semisilvered mirror. Although even a plain sheet of transparent material such as glass can be employed, it is more common to apply coatings to a transparent substrate to increase its reflectivity.

A common beamsplitter eye contact arrangement consists of a beamsplitter that is mounted in front of a display oriented at about 45 degrees to the display surface. The conferee using the terminal looks through the beamsplitter to view the display. A camera is disposed in front of the beamsplitter and captures an image of the conferee reflected in the semireflective beamsplitter. This technology has a number of drawbacks. First, the 45-degree angle of the beamsplitter placed in front of the display necessarily increases the bulk of the display. Second, if the beamsplitter is illuminated by ambient light, the quality of the image captured by the camera may be seriously degraded. This problem may be avoided by a hood of an opaque material extending from the display to the edge of the beamsplitter so that ambient light does not degrade the reflected image. However, an opaque hood makes the beamsplitter appear even more intrusive with the angled beamsplitter forming a visible barrier in front of the display surface. Whether the display is a computer desktop monitor or a big screen television, the awkwardness of the protruding beamsplitter and camera remain an inefficient use of space.

U.S. Pat. No. 5,117,285 to Smoot attempted to reduce the bulk of this type of terminal by applying polarizers to the display and camera, so that the beamsplitter can be angled more acutely, approximately 30 degrees, without having light from the display interfere with the reflection of the conferee. A drawback to this arrangement is the inherent loss of light caused by the polarizer which further reduces the display image brightness, which has already been reduced by the beamsplitter. Even though this technology reduces the angle of the beamsplitter, it still adds considerable bulk to the terminal and a transparent barrier still remains in front of the display. Also, terminal bulk is further increased by the camera placement, which must protrude far from the display to capture the reflection of the conferee in the 30-degree angled beamsplitter. This becomes a nuisance with desktop conferencing, because the camera is positioned in the conferee's work space where a keyboard is usually placed.

Another eye contact beamsplitter arrangement resolves this protruding camera problem by mounting it behind the beamsplitter. In this arrangement, the display is reflected by the beamsplitter for viewing by the conferee. The light of the reflection conceals the camera behind the beamsplitter. The camera thus captures the image of the conferee through the beamsplitter. If a flat panel display is used or if a CRT display is mounted in a desk's surface and aimed upward, the bulk of this system can be reduced substantially.

However, even with these improvements this arrangement suffers from an additional significant problem: namely the conferee can simultaneously observe the displayed image both in two ways, either by directly viewing the display or by viewing the reflection of the display on the beamsplitter. That is, as the conferee looks at the reflected image, it is easy to glance at an angle and directly view the display below the beamsplitter. The dual visible images in this arrangement is a severe distraction, as the conferee's attention is divided between the light of two images. If the conferee gazes directly at the display (as opposed to the reflection of the display), eye contact will be disrupted because the camera will capture an image of the conferee that appears not to look at the face of the remote conferee.

Prior Art Beamsplitter Arrangements

FIG. 1 illustrates a prior art eye contact beamsplitter arrangement in which the image of a conferee is captured by a camera 4 by means of a reflection in a beamsplitter 6. At the same time the conferee's image is captured, that conferee is able to look through the beamsplitter 6 to view a display 2. A hood 8, usually covered with an opaque material, is typically included to shield the beamsplitter 6 from ambient light. The drawbacks to this arrangement include the increased bulk of the terminal (although a flat panel will minimize this problem), the addition of a transparent barrier in front of the display which affects viewing the display surface, the appearance of the display being recessed far into the terminal creating a tunnel effect and, lastly, the awkward positioning of the camera 4 which intrudes into the conferee's work space.

FIG. 2 is a prior art eye contact beamsplitter arrangement that attempts to reduce the protrusion of the beamsplitter 6 by adding a polarizer 9. Here when properly configured with a second polarizer 11 on the camera 4, the camera 4 can be aimed more directly toward the display 2 without picking up the image on the display 2 through the beamsplitter. Despite some reduction in the angle of the beamsplitter 6, the unit still suffers from excessive bulk, a transparent barrier between the conferee and the viewing surface of the display 2. Also, the camera 4 protrudes awkwardly from the terminal on a stand 12, invading the conferee's work space.

FIG. 3 presents a beamsplitter arrangement in which the conferee views the reflection of the display 2 by the beamsplitter 6. The camera 4 is substantially concealed from view behind the beamsplitter 6 and is aimed through the beamsplitter 6 to directly capture the image of the conferee. As is illustrated, the significant drawback of this arrangement is the fact that the light from the display 2 is visible to the conferee simultaneously at the display 2 and as the reflection of the display 2 in the beam splitter 6 by the conferee. These two visible images compete for the conferee's attention and add distraction while conferencing, thereby reducing the quality of the conferencing experience.

OBJECTS AND SUMMARY OF THE INVENTION

It is an object of the present invention to provide a teleconferencing beamsplitter eye contact terminal with an image blocking film, so that light from the display source is concealed from the point of view of the conferee while simultaneously allowing a reflection of the display on a beamsplitter that is viewed by the conferee.

It is a further object of this invention to provide an eye contact terminal consisting of at least a camera and display configured in a single unit.

It is a further object of this invention to provide an eye contact terminal built integrally with various types of consumer electronic devices.

It is a further object of this invention to provide a eye contact terminal that has separate components for ease of upgrading.

It is a further object of this invention to enable convenient positioning of the beamsplitter in relation to the display.

It is a further object of this invention to provide a teleconferencing beamsplitter that is shielded from ambient light.

It is a further object of the present invention to use an image blocking film to enable a camera to capture a reflection of a conferee in a beam splitter aimed directly toward the display.

It is a further object of this invention to provide a terminal configuration that efficiently uses desktop space.

It is a further object of this invention to provide a terminal configuration of which the conferee can select from a direct view mode and a reflected view mode.

It is a further object of this invention to provide a compact and portable terminal configuration.

It is a further object of this invention to conceal the camera lens reflection.

It is a further object of this invention to integrate a terminal configuration into a table and desk.

It is a further object to utilize a display that is fabricated specifically with the image blocking requirements of this invention.

It is another object of the present invention to substantially reduce an undesirable double image on the beamsplitter.

It is a further object of this invention to provide a shutter so that the beamsplitter can be selected between a clear mode and an opaque mode.

It is a further object of the present invention to convert an image for both direct and reflected viewing.

It is a further object of the present invention to convert an image of a portable computer for both direct and reflected viewing.

It is a further object of this invention to provide an integrated eye contact terminal that operates as a fully functional personal computer and videoconferencing system and includes a module port for receiving a videoconferencing module that enables a videoconference.

Lastly, it is an object of this invention to provide an integrated eye contact terminal that operates as a fully functional personal computer and videoconferencing system for both a single user mode and also a group videoconferencing mode.

The present invention enables eye contact between conferees during a conference with a terminal that utilizes a beamsplitter that reflects the image of the display in such a way that only the reflection and not the display is seen by the conferee. The camera is positioned behind the viewing side of the beamsplitter in order to capture the conferee's image through the beamsplitter. To block unwanted light directly from the display, an image blocking film is applied between the beamsplitter and the display so that light from the display is concealed from the conferees's direct view. This concealment greatly improves this teleconferencing beamsplitter arrangement by eliminating the distraction of viewing both the display and the display reflection. Also, the camera is positioned behind the beamsplitter, so it does not disturb the work space of the conferee, thereby greatly improving this beamsplitter arrangement's practicality for desktop and other types of conferencing. Also, the present invention is an integrated device operating as a fully functional personal computer with a module bay which receives a videoconferencing module to enable a videoconference. The integrated terminal is also uniquely configured for both a single user mode and a group videoconferencing mode.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 1 illustrates a prior art beamsplitter arrangement in which the conferee views the display through a beamsplitter;

FIG. 2 illustrates a prior art beamsplitter arrangement that is configured with polarizers to reduce the angle of the beamsplitter from the display;

FIG. 3 illustrates a prior art beamsplitter arrangement in which the conferee is intended to view only the reflection of the display yet can still see light emanating directly from the display;

FIG. 4 illustrates the present invention in which image blocking film is used to conceal the display from direct viewing by the conferee;

FIG. 5 illustrates an embodiment of the present invention that conceals view of the display of light from all four sides;

FIG. 6 illustrates the present invention configured with the display laying flat and aimed upwards;

FIG. 7 illustrates the present invention configured with the display aimed downward;

FIG. 8 illustrates the present invention configured as a display of a laptop computer;

FIG. 9 illustrates the present invention configured as a separate unit that can be added to a display;

FIG. 10 illustrates a display with modifications to assist in the positioning of the reflection for desired viewing;

FIG. 11 illustrates an extension arm system which permits numerous positioning options of the beamsplitter in relation to the display;

FIG. 12 illustrates opaque material placed behind the beamsplitter;

FIG. 13 illustrates a beamsplitter with image blocking film applied behind the viewing side, so that ambient light is substantially reduced;

FIG. 14 illustrates sound from a speaker bouncing off the beamsplitter;

FIG. 15 illustrates a beamsplitter that is bowed, so that a compressed image is expanded when reflected;

FIG. 16 illustrates image blocking film angled in relation to the display to prevent reflections back onto the image blocking film; and FIG. 17 illustrates an alternative beamsplitter arrangement wherein the image blocking film is used to prevent light from the display from being captured by the camera.

FIG. 22 illustrates a terminal configuration that has a reflected view mode and a direct view mode.

FIG. 23 illustrates a positionable display integral to a terminal.

FIG. 26 illustrates a human interface section that can be covered by the beamsplitter when in a closed position.

FIG. 27 illustrates a detachable camera and camera storage.

FIG. 28 illustrates a camera embedded inside the housing.

FIG. 29 illustrates a baffle to block reflections upon the camera lens.

FIG. 30 illustrates a liquid crystal shutter to block unwanted reflections upon the camera lens.

FIG. 44 illustrates a beamsplitter with no contrast background permitting observation of another person on the other side of the desk.

FIG. 45 illustrates an LCD shutter contrast background.

FIG. 46 illustrates a fluid shutter contrast background.

FIG. 47 illustrates a solid removable contrast background.

FIG. 48 illustrates a polarizer arrangement serving as a contrast background.

FIG. 49 illustrates a polarizer arrangement with remote polarizer.

FIG. 50 illustrates a portable computer reflected eye contact configuration.

FIG. 51 illustrates a portable computer reflected eye contact configuration with separate beamsplitter.

FIG. 52 illustrates a normal view display.

FIG. 53 illustrates necessary image conversion for viewing the image upon a reflection.

FIG. 54 illustrates a physical positioning method of converting the image.

FIG. 61 illustrates an eye contact terminal with a beamsplitter that is positioned away from a keyboard area.

FIG. 62 illustrates a variation of a positionable beamsplitter.

FIG. 63 illustrates an eye contact terminal in which the display is positioned rearward so that the beamsplitter is away from a keyboard area.

FIG. 64 illustrates a side mounted display and beamsplitter arrangement.

FIG. 65 illustrates a side mounted display and beamsplitter arrangement closed and away from a keyboard area.

FIG. 66 illustrates an integrated transmissive display eye contact terminal with module port and peripheral connections for dual use as a single user terminal and group videoconferencing terminal.

FIG. 67 illustrates an integrated rear projection eye contact terminal with module port and peripheral connections for dual use as a single user terminal and group videoconferencing terminal.

FIG. 68 illustrates an integrated reflected camera-view eye contact terminal with module port and peripheral connections for dual use as a single user terminal and group videoconferencing terminal.

DETAILED DESCRIPTION OF THE PREFERRED EMBODIMENTS

Figure 18:
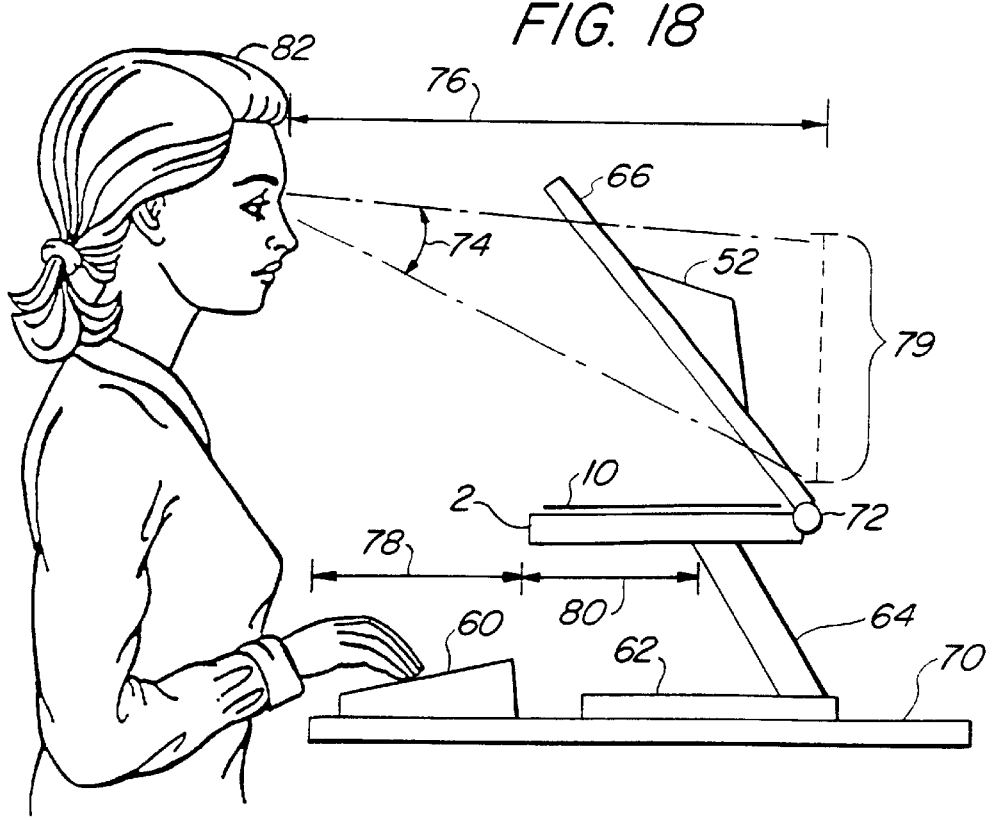
FIG. 18 illustrates a terminal configuration with the reflected display position.

The following description is provided to enable any person skilled in the art to make and use the invention and sets forth the best modes contemplated by the inventors for carrying out their invention. Various modifications, however, will remain readily apparent to those skilled in the art, since the generic principles of the present invention have been defined herein specifically to provide an improved beamsplitter-based teleconferencing device that uses image blocking film to eliminate distracting images.

Improved Reflected Display

Teleconferencing Eye Contact Terminal

An eye contact beamsplitter arrangement has been invented to overcome the problem of a conferee simultaneously viewing both the display and its reflection. An image blocking film 10 permits a display 2 to be viewed from one or more directions and prevents the interference of unwanted images. As seen in FIG. 4, a conferee can view the reflection from the display 2 on a beamsplitter 6. The conferee cannot, however, see the display 2 emitted directly, because direct light is blocked by the image blocking film 10. The conferee's attention, as a result, is now focused solely on the reflection and not distracted by a view direct from the display 2. A camera 4 in this arrangement is advantageously mounted behind the beamsplitter 6 away from the conferee's work space.

FIG. 5 illustrates the use of the image blocking film 10 to block the image when viewed from a side of the display 2. The image blocking film 10 that makes the present invention possible is a material that exhibits the uncommon property of being selectively transparent depending on an angle at which the material is viewed. That is, when the gaze of an observer is normal to a surface of the image blocking film 10, the film appears to be totally transparent and any object on the opposite side of the film, such as the display 2, is readily visible. However, if the observer views the image blocking film 10 at an angle to the film's surface, the image blocking film 10 has an appearance ranging from opaque to translucent: the observer's view of any object on the opposite side of the image blocking film 10 is obscured. The image can be blocked from two, three, or all four sides, if desired. For the present invention, it is critical that the image blocking film 10 block the image from at least the angle from which the conferee is viewing the display reflection, so that the display viewing surface itself is concealed from direct view. An advantage to placing the image blocking film 10 on the right and left sides of display 2 is that the image will be blocked from the reflection on the beam splitter 6 when the display 2 is viewed at an angle from either side. This feature adds security and privacy to a teleconference which proves useful in a busy office area, since a passersby cannot easily view the image.

The image blocking film 10 is available from several sources and can be based on various technologies. Whether the film is plastic or glass, the image blocking film as it is presented here is a material that permits transmission of light from at least one direction and reduces or eliminates light transmission from at least one other direction. Eyesaver International Inc. has an image blocking film named "Private Eye" that diffuses light from various directions. From the perspective of the conferee, when using this film, light directly from the display (as opposed to the reflected image) appears milky and diffused, eliminating the focused image. The diffused light, even though visible to the conferee, adequately conceals the image. Another image blocking film 10 is made by 3M Inc. and named "Light Control Film" and is preferred, because it can eliminate virtually all light transmission from a desired angle. This particular image blocking film 10 contains closely spaced black microlouvers and a wide selection of louver angles are available, and even more options are available by layering films. This means that the precise angle at which the image blocking film 10 "shuts off" can be selected in advance. When the image blocking film 10 "shuts off," it ceases to transmit light so that if the observer views the image blocking film 10 from an angle greater than the "shut off" angle the film appears to be opaque. When using this film the conferee sees only the black surface of the microlouvers which entirely conceals the image from the display 2 when viewed from the position of the conferee. The same effect can be produced by an array of tiny microlouvers supported, for example, by their ends. In that case the image blocker would not actually be a "film" but would fall within the bounds of the present invention.

This arrangement is preferably used with a flat panel display such as an active matrix liquid crystal or plasma display, among others. Flat panels permit the size of the terminal to be reduced and offers aesthetic design opportunities not possible with other eye contact display systems. Of course, more bulky displays such as CRT displays and rear projection screen displays may also be used with the present invention. The added size of the terminal caused by bulky displays may not be a disadvantage in some circumstances. Also, a bulky display can be hidden by being built into a table with the screen surface flush with the table surface, giving the appearance that the entire terminal consists of a floating beamsplitter. Both flat panels and more bulky displays can be built into tables and into cabinets mounted sideways and even upside down. In each configuration, image blocking film 10 is applied to the display, blocking its image from the conferee's direct view and leaving only the reflection on the beamsplitter 6 in view. Custom applications of this invention will be apparent to one of ordinary skill in the art.

FIG. 6 illustrates the present invention configured as a flat panel selfcontained unit. The display 2 rests on a surface, such as a desk or computer. On top of the display viewing surface is the image blocking film 10 that functions in the manner previously described. The beamsplitter 6 is attached to the display 2 by hinges 14. The hinges 14 permit adjustment of the beamsplitter 6 in relation to the display 2. Although 45 degrees is the "critical angle" for setting the beamsplitter 6 relative to the display 2, positions between about 30 and 60 degrees are useful depending on the exact setup employed. A flexible rod 26 holds the camera 4 in place and also carries electronic signal wires to the display 2 which contains all electronic circuitry for the display and the camera 4. The flexible rod 20 is attached to the display 2 by a connector 22. The flexible rod 20 is one of many possible mechanisms that can position the camera 4 behind the beam splitter 6. Its advantage is that it can be bent into numerous positions, allowing the camera to be adjusted both vertically and horizontally. A power line 16 supplies current to both the display 2 and the camera 4. A first port 18 allows the camera image to be cabled to the teleconferencing equipment so that the captured image may be viewed on a distant terminal. A second port 19 receives the incoming image signal, so that the distant conferee may be imaged on the display 2.

FIG. 7 illustrates a self-contained unit as seen in FIG. 6, except that the display 2 is mounted above the beamsplitter 6 with the display viewing surface aimed downward into the reflection of the beamsplitter 6. In this configuration the display 2 is connected to and supported by the one end of the beamsplitter 6 and two support legs 24 that rest on the desk-top, computer, or other flat surface. This configuration's operation is identical to the configuration of FIG. 6, except that no means of adjusting the beamsplitter 6 in relation to the display 2 is provided.

The present invention may also be built into devices that have other functions besides image display and image capturing. An example of this is seen in FIG. 8, where the present invention is built as a part of a laptop computer 26 with a keyboard 28. In this configuration, the beamsplitter 6 folds down onto the image blocking film 10 with the built-in display underneath and integral with the laptop computer 26. The beamsplitter 6 has a latch hook 25 connected to it, which is received in a latch hole 27 when the beamsplitter 6 is folded down by hinges 14. The flexible rod 20 and camera 4 retracts into a slot (not shown) in the back when the device is not in use. Besides integrating the present invention into a laptop computer, it may, in addition, be built into numerous portable devices such as palmtops, personal digital assistants, teleconferencing camcorders, and wireless teleconferencing systems. Nonportable devices, as well, such as videophones, all-in-one home computers, and televisions, to name only a few, will benefit from the present invention.

FIG. 9 illustrates a configuration where the main parts of the current invention can be configured as a separate kit to be added by the consumer to upgrade the existing display 2 and provide the practicality of modularity with interchangeable elements. As illustrated, the kit would contain the image blocking film 10 which is placed on top of the viewing surface of the display 2 secured by a VELCRO™ hook-in-loop fastener (not shown), or other appropriate fastening means can be used. The beam splitter 6 used in the kit is free-standing and held in place by stand legs 32 which are attached to the beamsplitter 6 by screws 34. The kit is completed by the camera 4 which is connected to the flexible rod 20 which, in turn, is connected to a flexible rod base 30.

Those skilled in the art will appreciate the design options made possible by the present invention. For example, the display 2 can be mounted flush with a desk surface with the image blocking film 10 seamlessly part of the desk's surface. From the conferee's perspective, the entire terminal would appear to consist of only the beam splitter 6 and the camera 4. Also, the display 2 can be built into decorative housings and cabinetry and mounted aiming downward or sideways towards the beamsplitter 6. It is also conceivable that the image blocking film 10 can be manufactured in designer colors.

Although desktop conferencing terminals will greatly benefit from this invention, it may also be configured into big screen displays. These larger displays are important when several conferees are imaged on one display. The ergonomics of a life-size image of the conferees greatly improves the teleconferencing experience.

Those in the optical coating art will understand the vast variations possible for the beamsplitter 6 in regards to its substrate, coating, and manufactured process. Both plastic and glass substrates, as well as stretched mylar, have been used for the beam splitter 6. The beamsplitter 6 can comprise a custom blend of optical coatings on a transparent substrate for superior reflectivity and transmission all the way down to off-the-shelf one-way mirrors with inconsistent and poor optical qualities. Also, the reflectivity and transmission, as well as other optical qualities of the beamsplitter 6, can be adjusted as needed. Despite these vast variations in the beamsplitter 6, the property of being both reflective and transparent remains the single most important constant.

The following description details the construction of one embodiment of this invention. A frame and stand for the beamsplitter 6 was constructed from acrylic plastic on which the beamsplitter 6 was mounted at about 40 degrees, so that the image is aimed slightly upward toward the face of the conferee. The beamsplitter 6 comprises a titanium coating on a float glass substrate. The coating was optically designed for approximately 40% reflectivity and 60% transmission. The plastic support frame was designed to straddle a Shard active matrix LCD panel Model QA-1750BL lying flat on a table top. The image blocking film 10 used was 3M Light Control Film (type LCF ABRO O OB90 CLR GLS 030) and was positioned on the viewing surface of the active matrix display, so that the image of the display is blocked from the conferee's direct view. Behind the beamsplitter 6 am ELMO CCD miniature camera Model TSN 402 was attached to a custom flexible rod 20 and base 30. The terminal was arranged as seen in FIG. 9 and was operated on a compressed video (MPEG) teleconferencing system.

Depending upon the angle between the beamsplitter 6 and the display 2, the reflection of the display 2 may have a trapezoidal shape. This subtle distortion is normally not a significant problem for most observers. However, if this distortion is unwanted, well-known image manipulation techniques can be used to "predistort" the image on the display 2 into a trapezoid with its longer side in a reversed position from a longer side of the trapezoid caused by the beamsplitter 6 angle. This way distortion caused by reflection will cancel out distortion imposed by image manipulation, and the reflected image will appear rectangular in shape. Also, manual controls may be provided for the conferee to choose the degree of predistortion so that the reflected image can be corrected at any angular setting of the beamsplitter 6. An automatic system can also be provided to simplify this procedure by sensing the angular relation of the beamsplitter 6 to the display 2 and automatically applying the optimum amount of predistortion to the image. Since a bezel or outer edge of the display 2 may also appear in the reflected image, it may be necessary to either provide a trapezoidal bezel or make the bezel matte black so it is not apparent in the reflection. It may also prove advantageous to manufacture display panels in a trapezoidal shape.

The reflection in beamsplitter 6 can also reflect not only the display 1, but also the surface on which the display 2 rests or is mounted, such as a desk top. If this reflection becomes an annoyance, a light-absorbing mat (not shown) extended around the display eliminates these unwanted reflections. Another method to eliminate these unwanted reflections is to put light-absorbing sides extended between the display 2 sides and the beamsplitter 6.

For greater flexibility in orienting the display 2 to the beamsplitter 6, the display 2 itself may be raised or lowered from the front or rear of the display 2. In FIG. 10 adjustable extension legs 36 are connected with stiff pivot hinges 38. The display 2 with these extension legs 36 can be raised and lowered from both the front and the rear. For even greater flexibility in positioning the beamsplitter 6 in relation to the display 2, one can allow the beamsplitter 6 to be adjusted by tilting, moving backwards and forwards, and closer and further from the display 2 (see FIG. 11). Extension arms 42 and 40 provide all of these movements through the use of connected stiff pivot hinges 44, 46, and 48. The conferee can adjust tilt, up and down and back and forth, with this positioning mechanism. Other positioning mechanisms, as well, may be integrated according to the needs of the particular configuration.

An additional amenity that can improve a free-standing eye contact terminal employing the present invention is the addition of a simple turntable beneath the unit. The turntable allows the entire unit to swivel to face the conferee. This is especially useful in the case of group teleconferences where a number of individuals want direct "one-on-one" contact with a person at a remote terminal. The turntable allows the display 2 and the camera 6 to be instantly aimed towards any participant. This can be accomplished either manually or automatically. The image blocking film 10 is selected so that no one in the group can directly view the display 2. That is, two layers of image blocking film 10 are used so that the image is blocked from all viewing angles except for a line of sight normal to the surface of the display 2.

To enhance the apparent reflectivity of the beamsplitter 6, ambient light behind the beamsplitter 6 may be reduced, depending upon the optical properties of the beamsplitter 6 and the intensity of the ambient light. FIG. 12 illustrates the use of an opaque material 50 (such as black painted plastic) covering all of a rear surface of the beamsplitter 6 except for a small area through which the camera 4 is aimed. Ambient light is completely eliminated from behind the beamsplitter 6 and, thereby, substantially improves the apparent reflectivity of many types of the beamsplitter 6. An optional camera housing 52 may be built of light absorbing material, as well. If only ambient light from a specific direction need be eliminated, then image blocking film 10 can be applied to the back side of beamsplitter 6 as seen in FIG. 13. Other ambient light reduction methods may be used, such as mounting the present invention in an enclosed cabinet or providing a removable hood for the terminal.

Because the beamsplitter 6 is mounted at an angle toward the conferee it is possible to bounce sound off the beamsplitter 6. By doing so teleconferencing audio is greatly improved, because sound will seem to originate from the center of the beam splitter 6 where the image of the distant conferee's mouth is located. FIG. 14 illustrates a speaker 55 aimed toward the beamsplitter 6 so that sound is bounced toward the conferee. Special directional speakers may be used to enhance this effect. The speaker 55 can also be mounted on the side of the display 2 (not shown) and additional speakers 55 may be used in various placements around the display 2.

An additional embodiment of the present invention employs a bowed beamsplitter 56 of FIG. 15. This enables the display 2 to be configured more narrowly than the common aspect ratio display 2. By squeezing the visible image with well-known image manipulation techniques, this smaller compressed image can be expanded to a larger image when reflected onto the bowed beamsplitter 56. This configuration is especially useful when a large image is desired, but the desk surface which the display rests on is limited in area.

Antireflective coatings can be applied as needed to suppress unwanted reflections from any of the optical surfaces involved. On the back side of the beam splitter 6, opposite the reflection side, an antireflection coating can serve to eliminate the ghosting effect apparent with many types of beamsplitters. Also, an antireflective coating, substrate, film textures (i.e., matte finish), light-absorbing color, or similar functioning material can be applied on top of or as a part of the image blocking film 10 when it is necessary to reduce a "back reflection," which is an image reflected from the beam splitter 6 back onto the image blocking film 10. FIG. 16 shows another method of dealing with back reflections. When the image blocking film 10 is angled (as opposed to parallel) in relation to the display 2, the back reflections are diminished or eliminated. An angle between the image blocking film 10 and the display can range from a few degrees to a much as 30 degrees or more. At large angles the image blocking film 10 advantageously incorporate slanted microlouvers to compensate for a change in angular relationship between the conferee and the image blocking film 10.

Another embodiment of the image blocking film 10 used for teleconferencing eye contact is seen in FIG. 17. The image blocking film 10 has significantly improved the prior art beamsplitter 6 arrangement, as seen in FIG. 2. Prior art technology based on polarizers significantly reduces the brightness of the display 2 since polarizers absorb at least half of the incident light. This, combined with the further brightness reduction caused by the beamsplitter 6, creates a noticeably dim image. The image blocking film 10 has a higher transmissivity than the polarizer 9, allowing a far brighter image. Also, a single substrate image blocking film 10 applied between the display 2 and the beamsplitter 6 does not suffer from the complexity of aligning the two polarizers 9 and 11. The image blocking film 10 allows the conferee to look through a single substrate to the display 2 image behind. From the perspective of the camera 4 the image is concealed by the image blocking film 10. Because the image is blocked, the camera 4 can be aimed more directly toward the display 2, i.e. between about 20 degrees and about 40 degrees, without picking up the light of the display 2 passing through the beamsplitter 6. As a result, the beamsplitter 6 can be angled more closely to the display 2, thereby reducing the protrusion of the beamsplitter 6. FIG. 17 shows the image blocking film 10 parallel to the front surface of the display 2. The image blocking film 10 may also be located on the side of the beamsplitter 6 facing the display 2 or at any position between.

Although this terminal still suffers from a protruding camera 4 on the stand 12, this protrusion can be reduced somewhat by using a small micro video camera. Instead of the stand 12, the camera 4 can be mounted on a movable base (not shown) which rests directly on the table or desk surface. A second mirror (not shown) may be used near the camera to correct the image reversal caused by the reflection of the beam splitter 6. The hood 8 is an optional element and may be used if ambient light is excessive. Variations in terminal design made possible by this improved beamsplitter 6 arrangement will be apparent to those skilled in the art of teleconferencing ergonomics.

Depending upon the type of the beamsplitter 6 and the degree of transmissivity used, adjustments to the light sensitivity of the camera 4 may improve image quality. Also, adjustments to the brightness of the display 2 may improve the reflectivity of some types of beamsplitters. Such light sensitivity and brightness adjustments of camera 4 and display 2 will be apparent procedures to one of ordinary skill in the art.

As is the case with all eye contact terminal technology, true eye contact cannot occur between conferees unless both conferees have an eye contact terminal. Even if only one conferee has an eye contact terminal, however, that conferee can transmit a eye contact signal for at least the other conferee to enjoy. In a multiple conferee session, portions of the screen can be designated for simultaneously displaying several incoming conferees. A more complex approach to multiple conferees is to use multiple cameras side by side in order to transmit different points of view of the conferees as if sitting around a table. Although not shown, it will be apparent as to how side-by-side cameras would be configured behind the beamsplitter 6.

Because the display is reflected on the beamsplitter 6, the image will appear to the conferee to be reversed. Image reversal techniques (either physical such as a mirror or electronic) can easily remedy this problem by appropriately reversing the image before it is displayed so that, when reflected on the beamsplitter, the image will assume its correct viewing orientation.

When viewing the reflection of the display 2 from the sides, the reflection of the display 2 will fall off the edge of the beam splitter 6 when the beamsplitter 6 is the same size as the display 2. A simple remedy for this is to make the beam splitter 6 as wide as necessary, so that the entire image remains reflected even when viewing from the sides.

Numerous embodiments of the present invention have been originated to overcome significant limitations of the reflected display eye contact approach. These following embodiments improve and advance this configurational approach by attending closely to the conferee relationship with the device in typical working environments. These embodiments are ideally suited for use with the image blocking film 10, but also serve to greatly advance the reflected display configuration even without the image blocking film 10.

FIG. 18 illustrates a conferee 82 seated at a desk 70 with common posture for using a keyboard interface 60. The configuration illustrated demonstrates a conferee to reflected display distance 76 of the reflected display position 79. Since all reflected display configurations reflect an image to the rear of the terminal the reflected display position may appear too far away for the conferee's 82 viewing comfort. The current terminal configuration enables the display 2 to actually slightly overhang the essential work area 78, if so desired, to bring the reflected display position 79 closer to the conferee (not shown). This ability to slightly overhang the essential work area 78 yet still allow the conferee 82 complete and unencumbered access to the keyboard interface 60 is permitted by a terminal construction with a base 62 supporting a terminal extension post 64 with display 2 positioned as a form of canopy over the desk 70. Though not shown, this terminal configuration may be adapted with a shorter terminal extension post 64 so that the terminal can rest upon a case containing personal computer hardware. Various lengths of extension posts 64 can be provided to the consumer of which then the extension post 64 will be a replaceable structural element. Fundamentally, the extension post serves to raise the entire display as a form of canopy off the desk 70 allowing access under the entire display and allows the conferee 82 to reach under the display all the way beyond to the rear side of the terminal to books and files etc. on the desk 70.

FIG. 18 also illustrates the conferee viewing radius 74 which extends through a beamsplitter terminal section 66 to the reflected image position 79. The beamsplitter terminal section 66 is a support housing for the beamsplitter 6 (not shown) and the camera 4 (not shown) inside the camera housing 52. The beamsplitter 6 (not shown) is of the approximate length of the beamsplitter terminal section 66. The following configurations, though shown with beamsplitter terminal section 66, may, as well, be configured solely of the beamsplitter 6 and various adaptations of beamsplitter 6 including configurations described and illustrated previously. The conferee viewing radius 74 intersects nearly all the beamsplitter terminal section 66. It is apparent that if beamsplitter section 66 was shorter in length the reflected display position 79 would be partly cut off from view by the conferee 82. Hence, the beamsplitter terminal section 66 is a mandatory length in order to allow the conferee to view the entire reflected display position 79.

A stiff hinge 72 permits manual angular adjustment of the beamsplitter terminal section 66 which both adjusts the camera position and the reflected image position. For example, if the beamsplitter terminal section 66 was tilted towards the conferee 82 the reflected display position 79 would also appear to tilt forward and likewise appear backwards if the beamsplitter terminal section 66 was tilted backwards. Obviously the conferee 82 may easily selectively choose the tilt most comfortable for viewing. However, most typically, the tilt selected for the reflected display position 79 is parallel to the face of the conferee 82. With this basic understanding of the conferee 82 postured at desk 70 and viewing the reflected display position 79 the beamsplitter terminal section 66 requires the minimum length illustrated in FIG. 18.

Considerable advancement in flat panel display technology and the reduction of the cost of these displays makes flat panels a prime candidate to replace the bulky cathode ray tube monitor on the desktop. Small cubicles, offices, and work spaces can greatly improve in efficiency with the added desktop space made available by a flat panel. By adding the additional component of the beamsplitter 6 for eye contact videoconferencing the minimum space requirements for the flat panel display will increase in size due to its angular relationship to the beamsplitter 6. The present invention presents many embodiments to overcome the added terminal bulk of a beamsplitter 6 to maintain the space efficiency inherent to flat panels on the desk 70.

A significant embodiment of the present invention is the construction of the terminal as illustrated in FIG. 18 to permit desktop space-saving by utilizing display 2 as a form of canopy over the desk 70. Desktop space-saving is especially dramatic when the terminal base 62 is constructed with a thin profile. The utilitarian spacesavings of the desk 70 under the canopy of display 2 improves work efficiency by allowing ready access to books, files, computer software, computer hardware, and so on. While display 2 in FIG. 18 is supported by terminal extension post 64, other structural methods to support display 2 as a form of canopy over the desktop 70 may be utilized as well.

Figure 19:
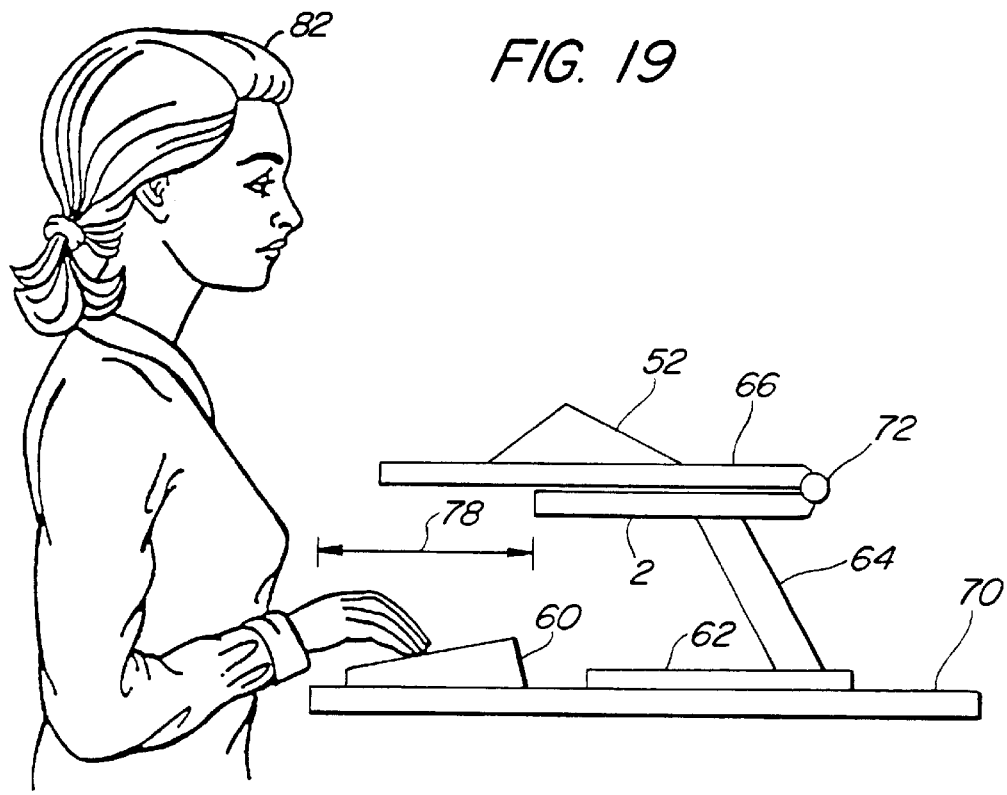
FIG. 19 illustrates a terminal configuration where the beamsplitter closed upon the display.

A fundamental configuration aspect of reflected image displays is the fact that the beamsplitter 6 is relatively thin and likewise the beamsplitter terminal section 66 can be constructed with a thin profile. This thin profile is ideal for permitting the beamsplitter 6 and the beamsplitter terminal section 66 to fold upon the display 2 by a manner similar to that allowed by stiff hinge 72. However, as described above, the beamsplitter terminal section 66 requires a minimum length for the conferee 82 to view the entire reflected display position 79. This length is considerably longer than the length of the display 2. As illustrated in FIG. 19 the beamsplitter terminal section 66 substantially protrudes, almost completely overhanging the essential work area 78, rendering for the conferee 82 a useless work area due to the protrusion. The essential work area 78, with the keyboard removed, could otherwise be used for handwriting letters, reading manuals, and so on.

Figure 20:
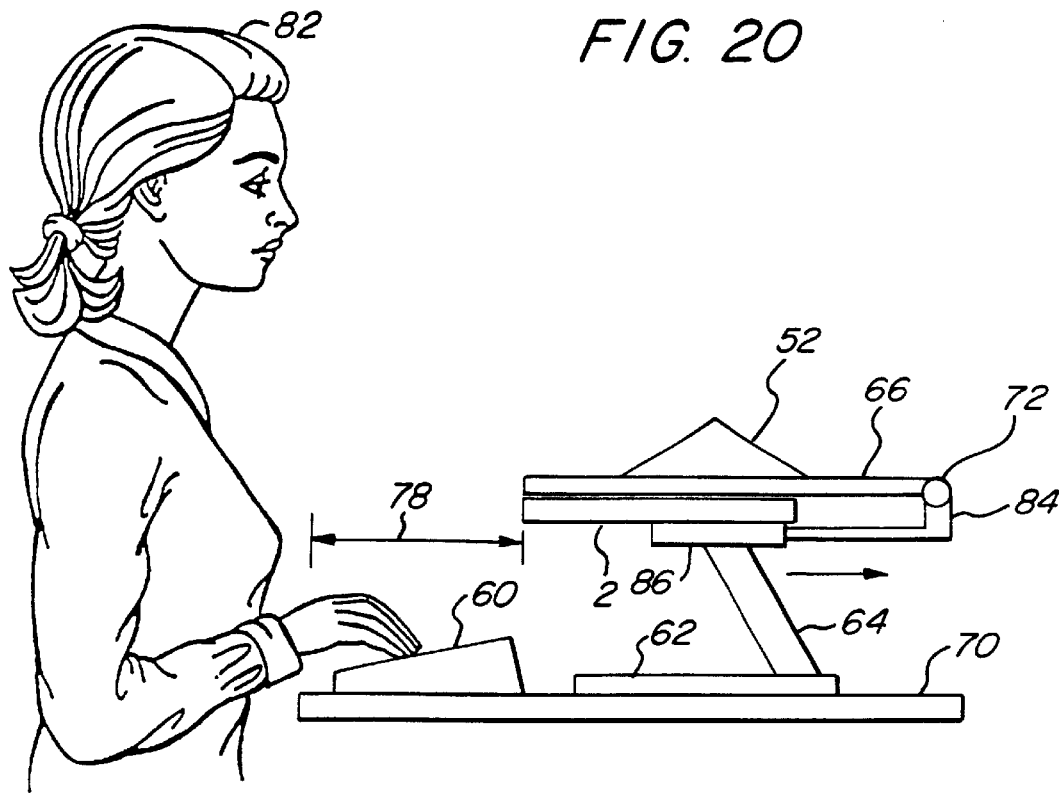
FIG. 20 illustrates a beamsplitter positioned out of an essential work area.
Figure 21:
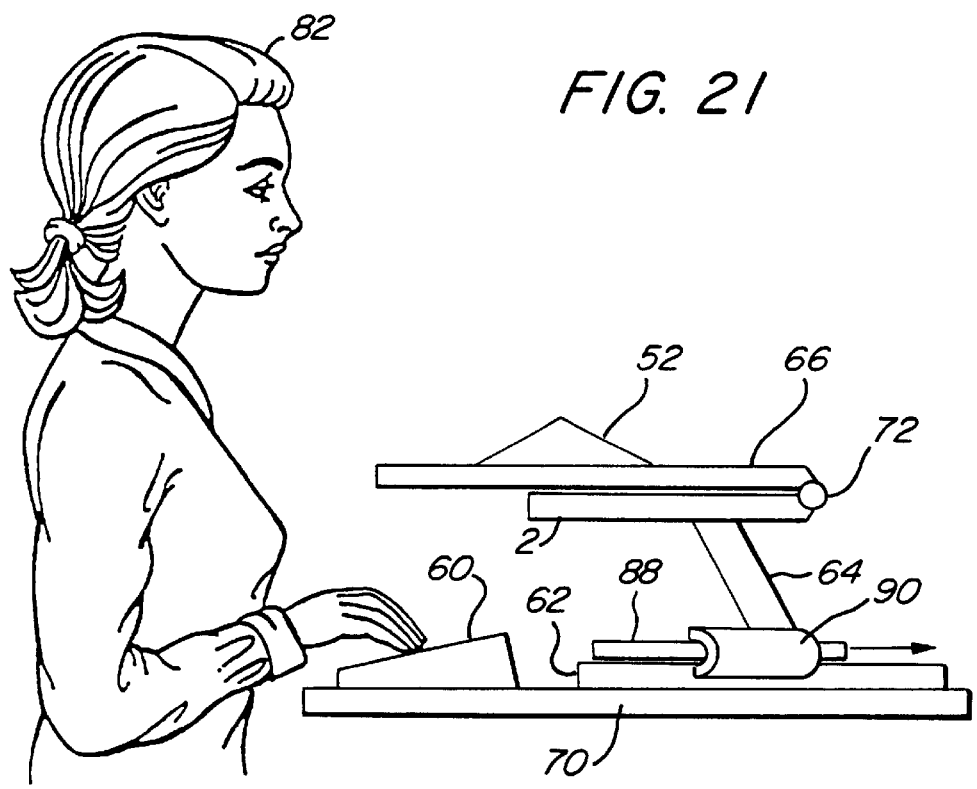
FIG. 21 illustrates a terminal configuration positioned out of an essential work area.

A significant embodiment of the present invention is illustrated in FIG. 20 which eliminates the protruding overhang into the essential work area 78 of the beamsplitter terminal section 66 when closed upon the display 2. In this configuration the beamsplitter terminal section 66 not only closes upon the display 2, but also shifts backwards away from the conferee by eliminating the protruding overhang into the essential work area 78. In this configuration the stiff hinge 72 is attached to a slide extension arm 84 which slides within sleeve 86. The embodiment of FIG. 21 shifts not only the beamsplitter terminal section 66 backwards, but also the display 2 a slide track in a bearing sleeve 90 attached to base 62. Other mechanical methods (not shown) may be utilized to shift at least the beamsplitter terminal section 66 and possibly other terminal components including the entire terminal backwards away from the conferee 82 without the nuisance of physically and strainfully lifting the entire terminal up, and then reposition to the back of desk 70. The apparent advantages of the beamsplitter terminal section 66 closed upon display 2 are the protection of the beamsplitter 6 and the display 2 from accidental damage and, most importantly, the conferee 82 can converse with others on the opposite side of the desk.

Another embodiment of the present invention as seen in FIG. 22 permits the conferee 82 to select between viewing the reflected display position 79 (as illustrated in FIG. 18) and viewing directly the display 2. Some consumers may require direct access to the display 2 for touch screen applications as well as other applications. A display stiff hinge 92 attached to a display support section 94 permits the display 2 to be positioned into various angles for comfortable viewing. The display 2 can be viewed through the image blocking film 10 or the image blocking film 10 can be folded by a double hinge 96 to an image blocking rear position 98. Likewise the image blocking film 10 can be removably attached to the display 2. Features described for FIG. 20 are applicable to the configuration of FIG. 22. The dual use modes and the possible configurations of an integral terminal may be applied as well to notebook computers and other portable consumer electronic devices.

FIG. 23 illustrates an additional embodiment where the display 2 can be manually positioned at various distances from the conferee 82. The display stiff hinge 92 is attached to a display short base 102 which rests upon a terminal platform 100. The display short base 102 is locked in place by a bolt 104 and a knob 106 to the terminal platform 100. Cut into the terminal platform 100 is an elongated track (not shown) the width of the bolt 104 so that the display short base 102 can be tightened down in various distances from the conferee 82. Though not shown, the embodiment of FIG. 23 can include the functional elements as described for FIGS. 20, 21, and 22. Most significantly the display 2 can be positioned away from the conferee by positioning the entire terminal back on the desk in a manner described for FIG. 21.

Reflected displays require the image source to produce a compensated image for accurate reflection viewing. Otherwise a reverse/inverted image will be seen at the reflected display position 79 (FIG. 18). The embodiments of FIG. 22 and 23 permit a direct view of display 2. Hence, the consumer will need to select between a direct view mode and reflection view mode of which the image source will produce a standard or compensated image. Reverse/invert image techniques can be inherent as to the display 2 driver electronics or separate from the display and originate from, for example, software from a personal computer. Reverse/invert controls can be manually selected by buttons located in an easy to reach place anywhere on the terminal. Also, reversing/inverting of the image source can occur automatically by, for example, triggering a switch when the display 2 is manually tilted up and down on the stiff display hinge 92.

Figure 24:
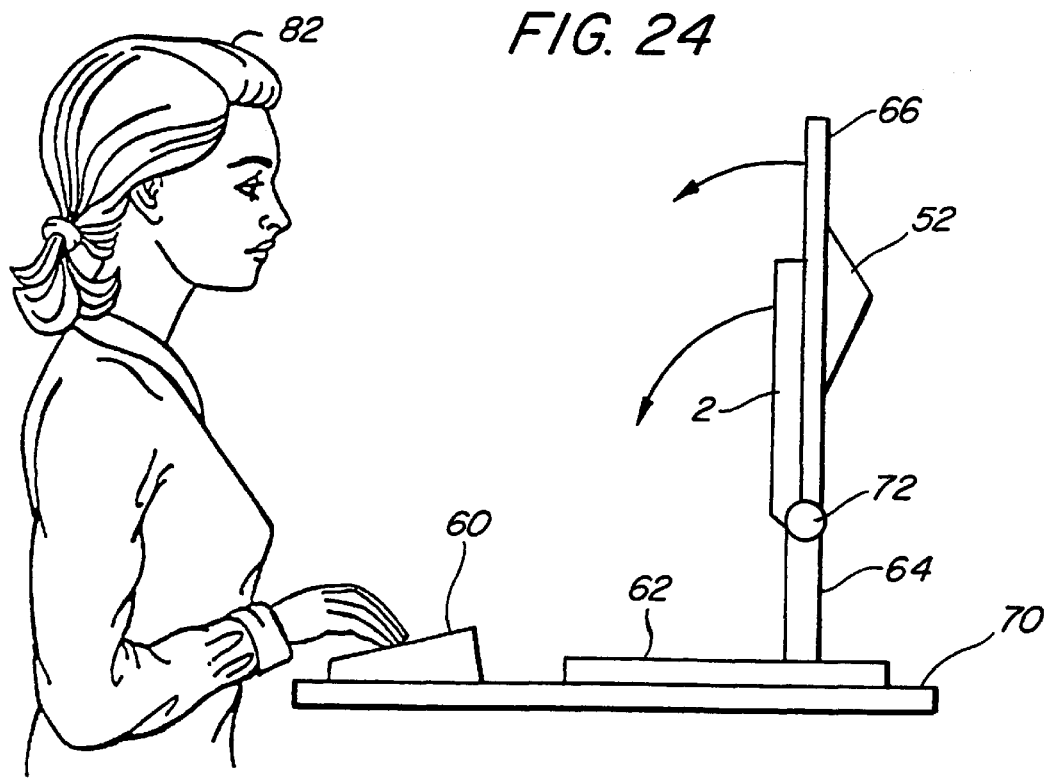
FIG. 24 illustrates a terminal configuration that allows both the display and the beamsplitter to be positioned for maximum desktop usage.

FIG. 24 illustrates another embodiment of the present invention which connects the stiff hinge 72 to the terminal extension post 64. In this embodiment, both the display 2 and the beamsplitter terminal section 66 are attached to the stiff hinge 72 so that both can be folded and aimed upwards freeing the entire desk 70 which can be utilized as a large and efficient work area. Functional elements as described for the embodiments for FIGS. 18–23 can be readily adapted to the embodiment of FIG. 24 to create a highly versatile desktop terminal.

Figure 25:
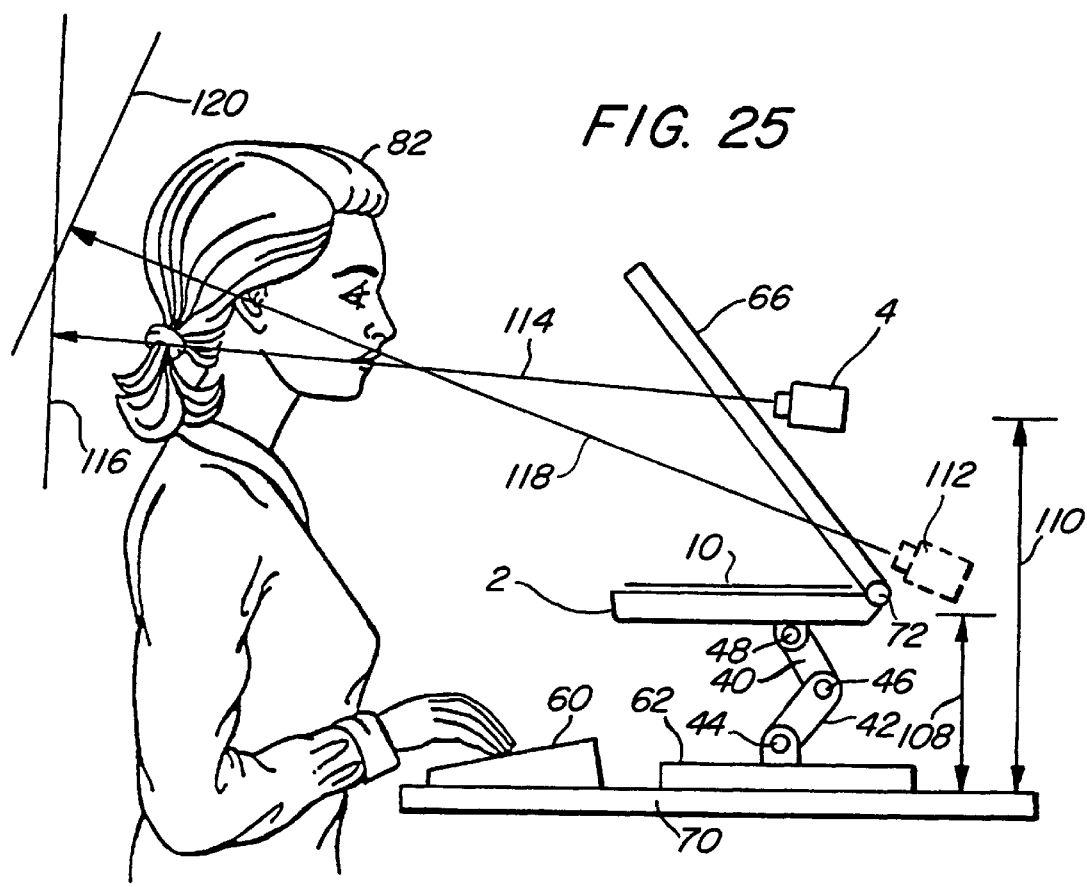
FIG. 25 illustrates height adjustments of the terminal configuration and its effects on camera aiming.

Still another significant embodiment of the present invention is seen in FIG. 25 where the display 2 and the beamsplitter terminal section 66 are supported by stiff pivot hinges 44, 46, and 48 connected to extension arms 40 and 42, permitting manual adjustments of the height of the display 2 relative to the desk 70. This relative height of display 2 to the desk 70 is illustrated by a dimension line 108. A primary concern for image capturing by the camera 4 is assuring horizontal aiming toward the conferee 82 as seen in aiming line 114. The result is capturing an image of a background perspective 116 that is parallel to the posture of the conferee 82. An inferior method of capturing an image of the conferee 82 is positioning the camera in camera position 112. The result is a angled aiming line 118 and an angled background perspective 120 showing in the captured image a background of the ceiling (not shown). Such camera positioning is fundamental to the art of audio and visual production and the horizontal aiming line 114 is typically used for news broadcasts. The stiff pivot hinges 44, 46, and 48 connected to extension arms 40 and 42 allows greater flexibility for conferee 82 selection of the camera 4 height position relative to the desk 70 as illustrated by a camera to desk dimension line 110.

Variations and modifications of the configurations 18–25 will be apparent to those skilled in the art when supplied the fundamental configurations of the present invention. Additionally, pivot and swivel mechanisms for pan/tilt functionality can aid in even greater versatility in the positioning of the display 2.

FIG. 26 illustrates a human interface section 122 built adjacent and integral to the display 2 represented by area 124. The human interface section 122 is covered by the overhang protrusion of the beamsplitter terminal section 66. Contained in the human interface section 122 can contain an integral data interface (not shown) such as the keyboard 28 similar to that seen in FIG. 8. Hence, a compact terminal for portable computing, such as a battery operated notebook computer, can have all its key elements including the display 2, the beamsplitter 6, and the keyboard 28 protected from accidental damage and ease of portability by having all these elements closed upon one another by stiff hinge 72. Also, the human interface section 122 can contain a phone dial and a hand held phone receiver with microphone and speaker (not shown) so that this terminal can function as a stationary and portable videophone. Another configuration not shown enables the portable configuration described above to have adjustable extension legs that fold out from the bottom of display 2 raising the camera 4 above desk 70 to a height for near horizontal aiming as previously described for FIG. 25. Still another embodiment not shown would allow the human interface section 122 to detach from the display 2 and allow the human interface area 122 to be placed on a desk in a similar position as the keyboard interface 60 in FIGS. 18–25.

Another embodiment of the present invention is illustrated in a cutaway FIG. 27 where a removable camera housing 126 detaches from the beamsplitter terminal section 66 and may be optionally stored for portability in a slot 144 to the side of display 2. The slot 144 can be accessed through a slot door 148 connected to the display 2 by slot hinge 146 and a lock latch (not shown). Camera 4 is seen with an optional camera electronic board 130, camera ribbon cable 132, and exposed contacts 134 assembly contained with in the removable camera housing 126. Power and video are passed to a contact receptacle 136 on the beamsplitter terminal section 66. The removable camera housing 126 is attached to the beamsplitter terminal by a hook latch 127 and magnetic connections 138 and 140. A camera lens 128 is aimed through a hole 142 in the beamsplitter terminal section 66 to capture images through the beamsplitter 6. Various adaptations to remove the camera 4 will be apparent to one of ordinary skill in the art. Despite the possible variations, when the camera housing 126 is removed the beamsplitter should be protected from accidental damage on the camera side. Small shutter doors (not shown) may serve to cover up holes in the back of the beamsplitter terminal section 66.

Another embodiment of the present invention is seen in a cutaway FIG. 28. Instead of having the removable camera housing 126, the camera 4 can be built between the beamsplitter 6 and the rear wall 155 of the beamsplitter terminal section 66. As camera technology improves and miniaturizes this would certainly be preferred placement of the camera 4 for it would provide an aesthetically pleasing thin profile to the beamsplitter terminal section 66 and improve portability due to increased compactness.

Still another embodiment of the present invention seeks to remedy the problem of the camera 4 lens 128 being visible to the conferee while using the display. Reflections upon lens 128 can be minimized by selecting a lens of a given size and curvature that is not prone to forming reflections. Often antireflective coatings are applied to the various optics that comprise a lens and these coatings can be adjusted, as well, to minimize reflections on the lens 128. An antireflective layer can be disposed in front of lens 128 on a separate substrate as well (not shown). A mechanical method of reducing and even eliminating the lens reflection uses a manual slide baffle 154 with a finger lever 156 (FIG. 29). Another form of baffle can use two polarizers in front of camera 4 that can be adjusted in relation to one another permitting a transparent mode and a baffle mode. Also, a shutter or baffle can be integral to the lens 128. Of course manual methodology can be replaced by an automatic function controlled by a touch of a button. Such modifications will be apparent to one of ordinary skill in the art. A non-mechanical approach utilizes a liquid crystal or similar operating shutter which can alternate from a transparent mode to a diffused or even opaque mode. FIG. 30 illustrates a liquid crystal shutter 150 with an electrical connection 152 which, depending upon a controllable electrical current, can be selected for either a transparent mode of, which camera 4 can be aimed through or an opaque mode which conceals the lens 128 from the conferee's view. These baffle and shutter methods described will not permit an image to be captured of the conferee 82 while they are concealing the lens 128. So the baffles and shutters are engaged when the display 2 is utilized for non-videoconferencing modes.

Figure 31:
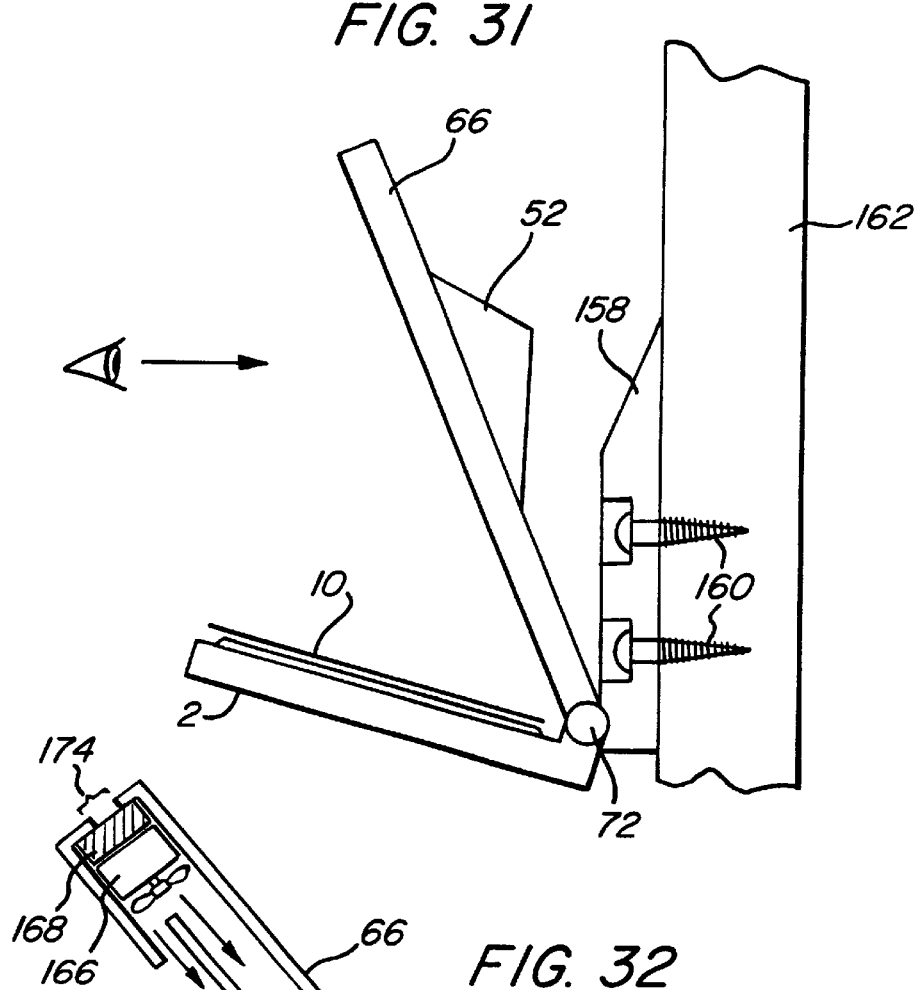
FIG. 31 illustrates a terminal configuration that is mounted to a wall.
Figure 32:
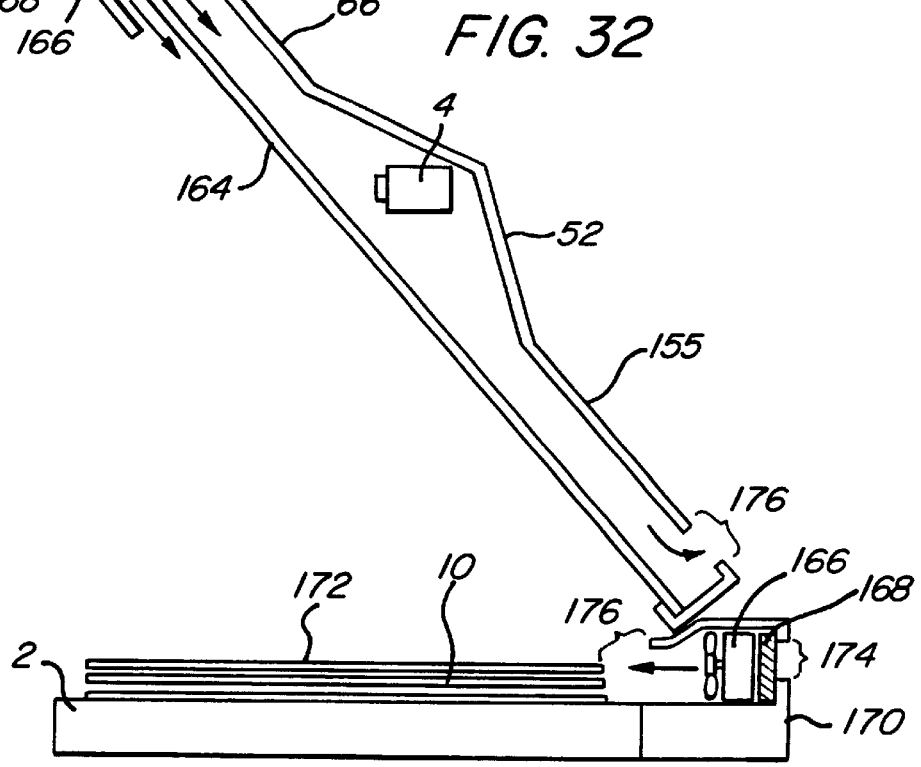
FIG. 32 illustrates methods for dust removal from terminal components.

Another embodiment is illustrated in FIG. 31 where the present invention is designed in the manner of a hang-on-the-wall videophone or hang-on-the-wall computer phone. The stiff hinge 72 is connected to a wall mount 158 which is attached to a wall 162 by screws 160. Both the beamsplitter terminal section 66 and the display 2 are attached to the stiff hinge 72 permitting them to fold out and away from the wall from a closed position (not shown) to an open position as seen in FIG. 31. A hand-held phone receiver including microphone and speaker and phone button interface, and the phone communication electronics, and any supporting computer can be adapted into or next to this primary configuration as desired by one of ordinary skill in the art Another embodiment is a dust removal system which does not require the cleaning energies of the conferee to maintain ideal operating efficiency of the terminal components. The collection of dust on either the viewing surface of display 2 and both sides of the beamsplitter 6 will effect optimum performance of the camera 4 image capturing and the viewing the display 2 reflection on the beamsplitter 6. FIG. 32 illustrates the use of a fan 174 with an air intake 174 supplying a stream of air through an air filter 168. The fan system is deployed on both sides of the beamsplitter 6 and air flow can pass from behind through an air outtake 176. Also, the same type of fan arrangement from a fan section 170 can pass air over the display 2, the image blocking layer 10, and an optional conductive layer 172. The conductive layer 172 can also be applied to one or both sides of the beamsplitter 6. The conductive layer is typically grounded, removing static electricity that can attract dust. The air flow from fans 174 can also, be treated by deionizing techniques and other air treatment techniques commonly used in clean rooms. Also anti-static and dust repelling materials can be utilized in the entire construction of the terminal. Of the options provided, one or more can be utilized and in any combination. Lastly, the area between the back side of the beamsplitter 6 and the rear wall 155 can be sealed air-tight so that no dust can enter and thereby no dust can be deposited on the back side of the beamsplitter 6 (not shown).

Figure 33:
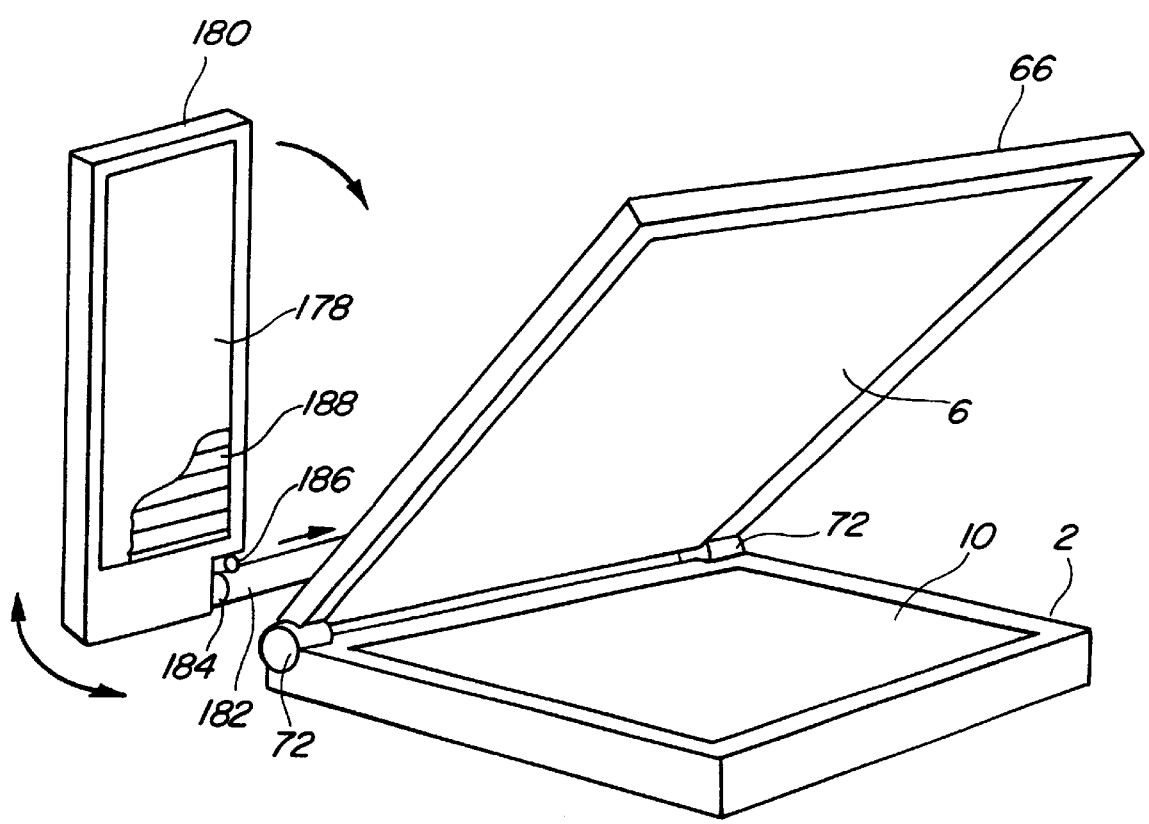
FIG. 33 illustrates an adjustable light source as a part of the terminal configuration.

Another embodiment provides illumination of the conferee 82 by an adjustable light system that is fixedly attached to the various configurations of the present invention. A light 178 in light housing 180 is fixedly attached to the back of the beamsplitter terminal section 66 by a retracting light stem 182 which retracts into a housing section (not shown) designed to hold the light stem 182 in a closed or pulled out mode as seen in FIG. 33. In the closed position, the light 178 rests upon the back of the beamsplitter terminal section and is locked in place by a latch for portable use (all not shown). A light pivot 184 permits the light housing 180 to tilt forward and backward and a light swivel 186 permits the light housing 180 to pan right and left. A full degree of adjustable direction will permit the light to be aimed by the conferee for optimum illumination. An additional retracting light on the right and above the beamsplitter terminal section 66, with same degree of tilt and pan, will add even more illumination choices for conferee 82. Likewise retractable lighting systems can be attached to the display 2 or the base 62 or the terminal extension post 64 as seen in FIG. 18 (not shown). Lighting is preferably a dimable and color corrected florescent source. Florescent is preferred because it emits a minimal amount of heat and the light is contained in a wider area than a spotlight. This is important because a spotlight can cause a great deal of visual irritation and distraction when looking at the reflection of display 2 on the beamsplitter 6. A soft bank of light, such as that of light 178, on the other hand, will not cause the same visual irritation and distraction. A directable light louver 188, of any type, may be added to the front of the light 180 to focus the light upon the conferee and prevent light from washing out the display 2. Other filters, such as diffusion filters and holographic filters, may, as well, improve overall illumination options and performance.

Figure 34:
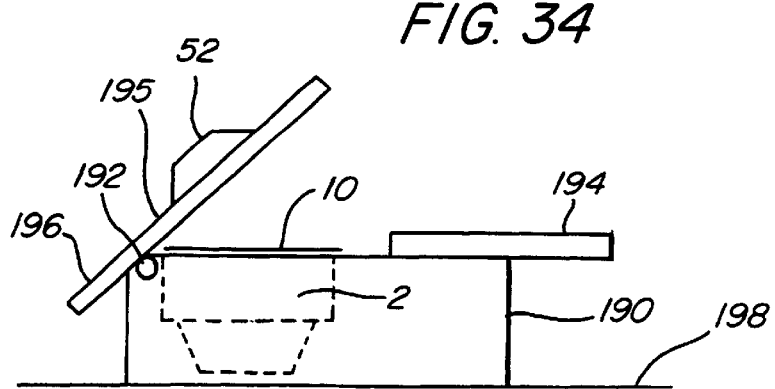
FIG. 34 illustrates a conference table incorporating the present invention.

Another unique embodiment of the present invention is to utilize on actual table or desk serving two modes of use. The first mode is as a common working surface 195. The second is as a eye contact teleconferencing device where the common working surface 195 is tilted upward with a beamsplitter attached to opposite side and exposing the display 2. FIG. 34 illustrates a tiltable conference table top 196 when in a closed position seamlessly integrates with a permanent conference table top 194. On the opposite side of the tiltable conference table top 196 is attached the beamsplitter 6 (not shown). The tiltable conference table top 196 is tilted by a stiff spring hinge 192 holding it in the desired angle. The entire table is supported by a support structure 190 which also conceals display 2 and rests on a floor 198. With this configuration many conferees can be seated at one end of the conference table and all interact with the reflected display 2 on the beamsplitter 6. Camera housing 52 is optional and the current configuration can include camera options discussed in this specification as well as any other mounting methods.

Figure 35:
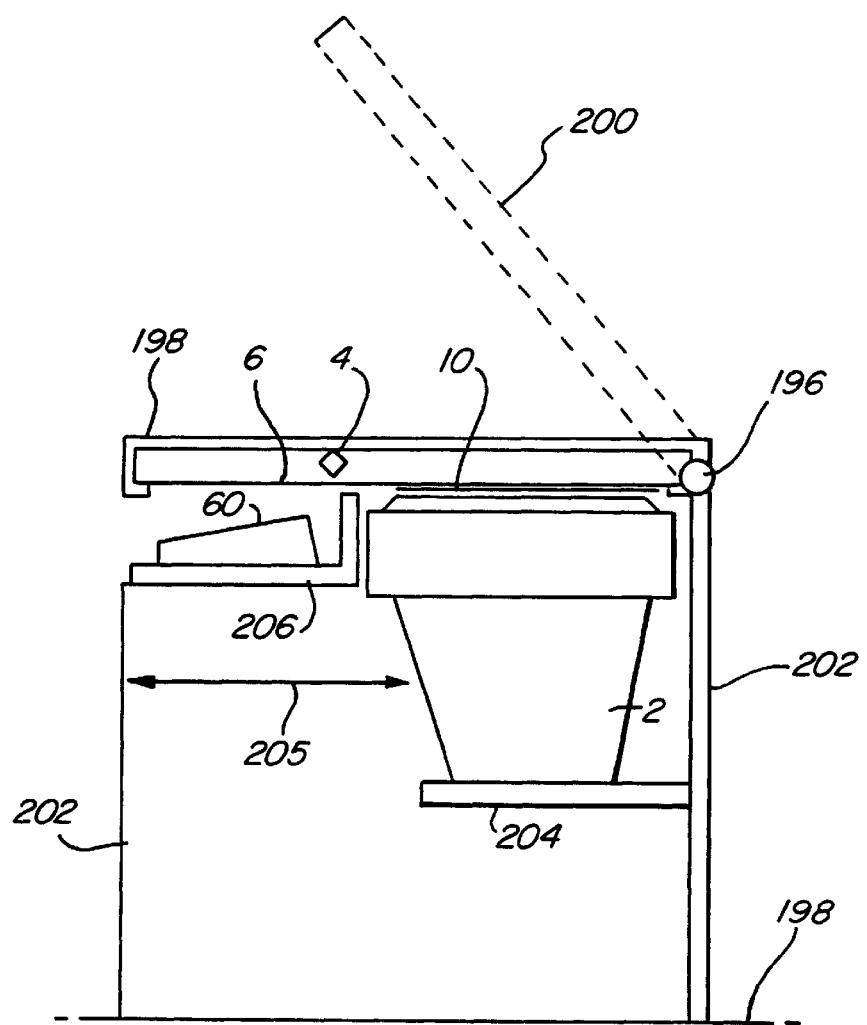
FIG. 35 illustrates a desk incorporating the present invention.

FIG. 35 illustrates a cutaway view of a further embodiment of the present invention in a common desk. A desk wall construction 202 supports display 2 on a display ledge 204 and keyboard ledge 206. A desk top section 198 serves as a common working surface but when tilted up to a position 200 exposes camera 4, beamsplitter 6, display 2 and the keyboard interface 60. A designated leg room area 205 permits the display 2 to be a typical bulky CRT or rear projection device.

Figure 36:
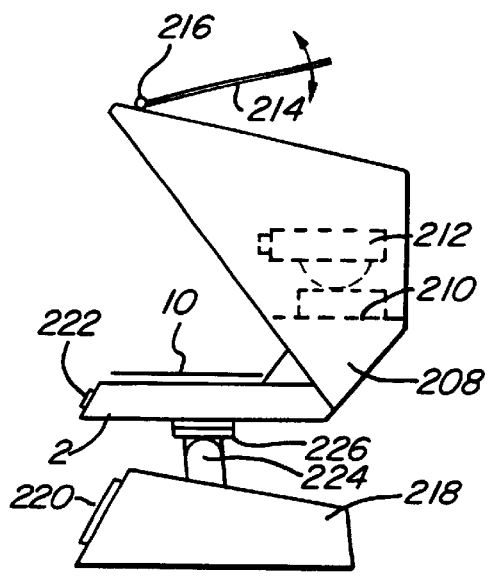
FIG. 36 illustrates a terminal configuration with a versatile camera housing.

Another embodiment of the present invention includes the incorporation into a single terminal, various support components for enabling a complete videoconferencing experience. FIG. 36 illustrates a terminal base 218 which includes speakers (not shown), speaker grill, and enough room for system electronics including transformers. Attached to the base is a component pivot 224 and a component swivel 226 which permits the display above to pan and tilt with a wide selection of positioning choices. A microphone 222 is built into the front face of display 2. Also attached to display 2 is a versatile camera housing holding the beamsplitter 6 in the appropriate angle (not shown). The versatile camera housing 208 includes camera mounting ledge 210. A camera access door 214 is attached by a camera door hinge 216 to the versatile camera housing 208. A remote controlled pan/tilt camera 212 is mounted upon the ledge 210, but numerous other consumer and professional video cameras with both digital and analog outputs can be mounted onto the camera mounting ledge 210.

Figure 37:
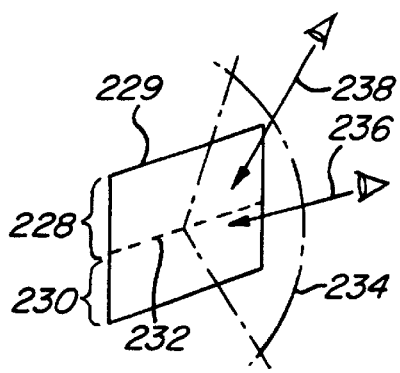
FIG. 37 illustrates the preferred vertical viewing angle of a display as it relates to the present invention.

FIG. 37 illustrates the vertical viewing angle of a sample image display 229. the sample image display 229 is divided into two parts forming a top section 228 and a bottom section 230 dividing the sample image display 229 with a top and bottom division line 232. The top section 228 is that portion of the sample image display 229 closest to the conferee 82 (for visual reference nearest the microphone 222 of FIG. 36). The sample image display 229 will permit a view of its image when a user is parallel to the display looking straight on at it as illustrated by a straight on viewing line 236. However, when viewed from an oblique angle from the top side, defined here as an oblique top side angle 238, the sample image display will be obscured from viewing. As described and illustrated, image blocking film can consist of several materials that either diffuses the visible luminous image or nearly or completely "shuts off" the image from the an oblique top side angle 238 and thereby eliminate the distraction of seeing the two images simultaneously.

Figure 38:
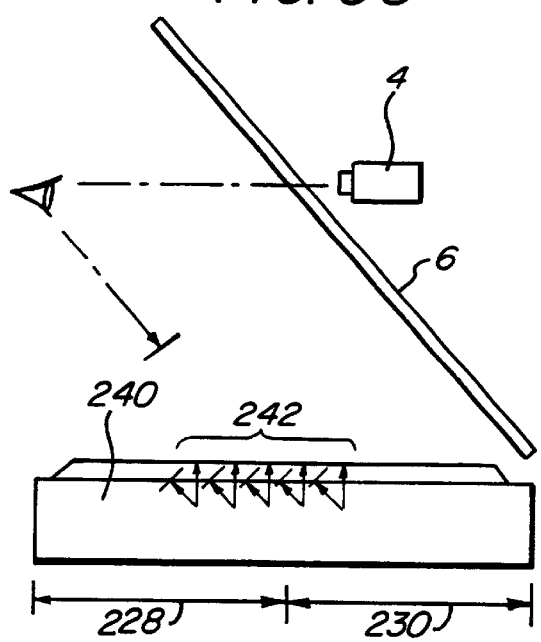
FIG. 38 illustrates a display which is constructed to image block when viewed from an oblique angle.

FIG. 38 illustrates a further embodiment of the present invention of which an image blocking property is integrally constructed into the display technology. An image blocking display 240 is integrally constructed with a specified image blocking property as seen in example section 242. The luminous image is reflected by the beamsplitter 6, yet from the oblique top side angle 238 the luminous image has become obscured either by the appearance of becoming diffused or eliminating nearly all the luminous image. Liquid crystal structures are typically designed with criteria for the maximum horizontal and vertical viewing angle. A specific liquid crystal display construction will permit the required image obscuring from the oblique top side angle 238. Those skilled in the art will understand the peculiar image blocking requirement of the present invention and can adjust display construction techniques, whether it be liquid crystal or some other form of display, to satisfy that requirement.

Figure 39:
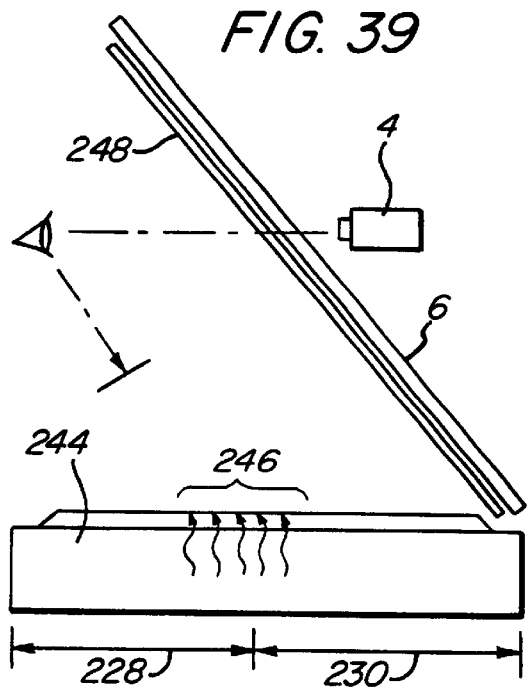
FIG. 39 illustrates a display that requires a remote polarizer to form a completed image.

FIG. 39 illustrates an alternate embodiment of which an incomplete polarization of a liquid crystal display is utilized creating an incomplete image display 244. An example, portion 246 shows an incomplete image formed by the incomplete image display 244. The incomplete image display will appear luminous yet with a subtle ghost image that may not be considered a distraction while utilizing the reflected image on beamsplitter 6. A remote polarizer 248 is positioned either in front or in back of the beamsplitter 6 or can be integral to the optical coating on the beamsplitter 6. The introduction of the remote polarizer 248 completes the image formation process. Hence, the beamsplitter 6, or at least a layer in front of beamsplitter 6, serves as an extension of the display with the addition of the remote polarizer.

The beamsplitter 6, even when constructed for typical consumer use is much safer than a cathode ray tube under vacuum pressure. As with all display and electronic products, care should be given to preserve all the components. A very unusual requirement to "ruggedized" the beamsplitter 6 for military use can be achieved either through the methods of heat tempering and/or chemical strengthening processes. Remote camera zooming systems, as well, are necessary if the consumer desires not to reach behind the beamsplitter 6 to manually change the zoom on the camera 4. Remote pan/tilt and zoom may all be conducted by the conferee at the distant site for such applications as medical conferencing. The display 2 may, in all the embodiments and configurations of the present invention, be a 3-D display. The beamsplitter 6 is constructed out of any material including plastics.

Figure 40:
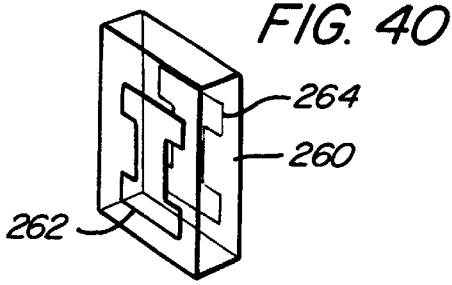
FIG. 40 illustrates a beamsplitter with an undesirable double image.
Figure 41:
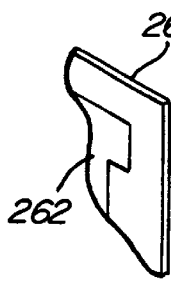
FIG. 41 illustrates a beamsplitter that has been chemically hardened to reduce the thickness of the beamsplitter and thereby reduce the double image.

It is a further embodiment of the present invention to custom fabricate the beamsplitter 6 so that it will substantially reduce a reflected double image on the back side of the beamsplitter opposite the image display 2. FIG. 40 illustrates a common beamsplitter 260 with a sample reflected icon 262 reflected from the image display 2. A reflected double image 264 is seen on the opposite side of the common beamsplitter 260. The reflected double image 264 becomes more apparent as the common beamsplitter 260 glass substrate increases in thickness. For example, the reflected double image 264 would be more noticeable with ¼ inch thick glass than with ⅛ inch thick glass. This reflected double image 264 is a great irritant when viewing an image on beamsplitter 260 i-or close up computer use such as word processing or industrial graphic design. Even with highly sophisticated antireflective coatings applied to the common beamsplitter 260 the reflected double image 264 may still be apparent to the viewer. FIG. 41 illustrates the use of a chemically hardened glass beamsplitter 266. Through the processes of chemically hardening a glass substrate a beamsplitter can be reduced in its thickness substantially and thereby substantially reduce and even eliminate the reflected double image 264. For example, the strength of a ¼ inch thick piece of glass could be approximately equal in strength to a ¹⁄₁₆ inch thick chemically hardened piece of glass. This technology, when deployed in all embodiments and configurations of the present invention, substantially eliminates the irritant of seeing the reflected double image 264.

Figure 42:
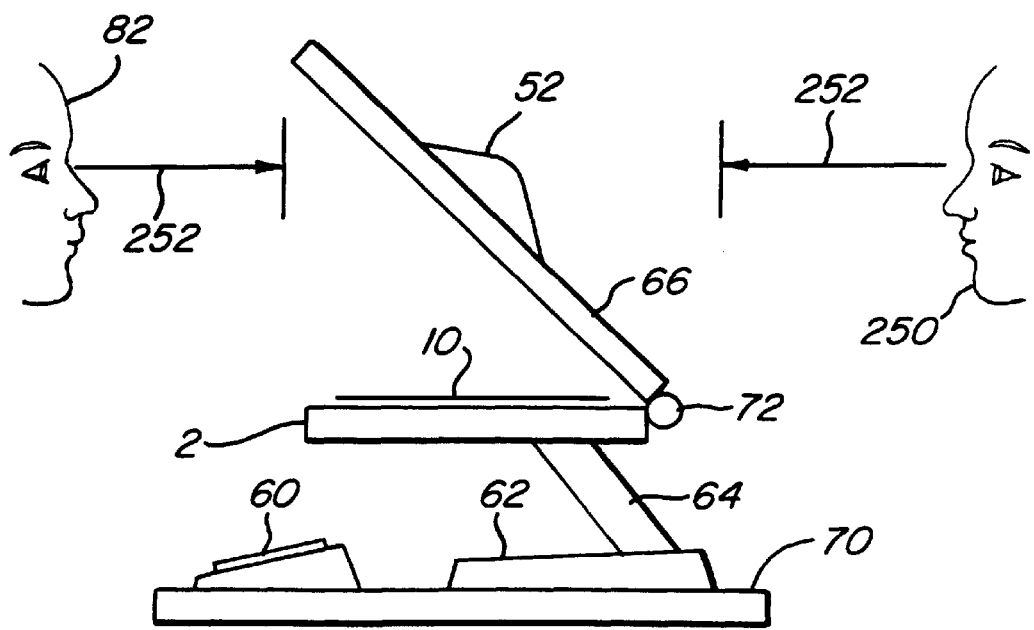
FIG. 42 illustrates the inability to converse with a person seated at the opposite side of the desk.
Figure 43:
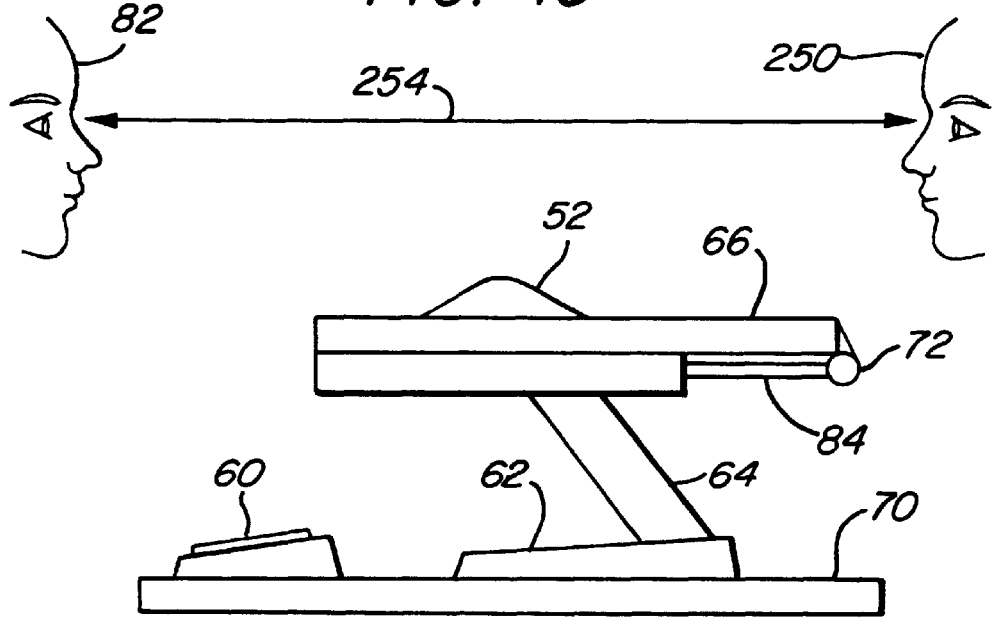
FIG. 43 illustrates the present invention with a foldable section to permit conversation from one side of the desk to the other.

FIG. 42 illustrates the present invention open in use by the conferee 82. While ideal for eye contact videoconferencing the conferee cannot see through to other side of desk to converse to others who may be present. An obstructed sight line 252 is experienced by both the conferee 82 and an office guest 250. Certainly the embodiments of the present invention resolve this problem by enabling the beamsplitter terminal section 66 to fold down upon the display 2. FIG. 43 illustrates the beamsplitter terminal section 66 folded down permitting the conferee 82 and the guest 250 to have a sight line 254 of each other. Alternatively or in conjunction with this fold down feature, the present invention is intended, as well, to allow the conferee 82 to look through and beyond the beamsplitter 6 to the guest 250 maintaining the sight line 254 as seen in FIG. 44. Unfortunately, contrast of the image reflected by the beamsplitter 6 is minimal since there is not an opaque black background.

A shuttering system is preferred for many applications so that the conferee need not go through the physical movement of lowering the beamsplitter 6 and the beamsplitter terminal section 66. FIG. 45 illustrates an LCD shutter or similar electrical responsive material that can, at the touch of a button, switch from a clear mode to an opaque mode. Electrical source 258 applies necessary voltage to a responsive substrate 256 for mode selection. FIG. 46 illustrates a fluid shutter which utilizes non-mixing fluids in which a fluid 262 is clear and a fluid 260 is opaque. The fluids are wedged between the beamsplitter 6 and a clear substrate 264. A fluid chamber 270 contains an opaque fluid section 276 and a clear fluid section 278. The sections are separated by a movable baffle 274 connected to thumb slide 272. By moving the thumb slide 272 either the opaque fluid 260 retracts or regains forming a contrast background. Tubes 266 and 268 deliver the fluids from the fluid chamber 270.

A solid opaque substrate 280 as seen in FIG. 47 can as well be deployed in numerous methods. For example black material can roll up on a spindle 282 and repositioned by a push knob 284. Venetian type blinds can be utilized or the solid opaque substrate 280 can simply snap on and off. An arrangement of polarizers can as well be utilized for a switchable clear and opaque mode. FIG. 48 illustrates a contrast polarizer 283 and a second contrast polarizer 281 which can be spun from a clear mode to an opaque mode. Circular polarizers or lenticular polarizers can be utilized as well to achieve the same functional outcome. A hole 279 in FIGS. 47 and 48 is provided so that the camera has an unobstructed view through the beamsplitter 6. FIG. 49 illustrates an embodiment of the present invention similar to that seen in FIG. 39. Here the remote polarizer 248 is actually separate from the beamsplitter 6 and can be worn by the conferee as glasses. An incomplete image display 244 with a removed polarizer from an LCD panel, for example, will not form an image. It is well known in the art that polarized glasses will form a picture and have been used as a privacy filter for computer displays. It is completely unique to this invention that the actual image is transparent and see-through unless polarized glasses are used. The application of this invention extends far beyond eye contact videoconferencing and can be used as a unique display system without a camera. For example, such a display system of FIG. 49 could be used as a control panel visible only to the operator of a vehicle and not to passengers even though both are looking through the same vehicle window.

FIG. 50 illustrates another embodiment of the present invention in which a beamsplitter terminal section 66 or at minimum the beamsplitter 6 can be stored opposite the portable display 270 in a compartment 285 by a slide post 287. The portable display 270 connects to the portable keyboard section 272 by a portable computer hinge 274. Other storing methods may be utilized as well as a part or separate from the portable computer. FIG. 51 illustrates a separate beamsplitter 6 or likewise beamsplitter terminal section 66 (not shown) so that a portable computer can be used in a reflected mode for eye contact videoconferencing. Hence the desktop device may remain on the desk while the consumer can use a the portable computer in other environments. The camera 4 contained in camera housing 52 may detach and store or connect directly to the portable computer (not shown). The separate beamsplitter 6 in FIG. 51 is connected by a first pivoting hinge 282, a second pivoting hinge 278 a height arm and thin stand 276. In concert, they can position the beamsplitter 6 at various heights and enable various tilting angles. Portable display 270 can as well be detached and elevated to an adjustable canopy position 284.

FIGS. 50 an 51 are utilized in the same direct view mode and reflected view mode as described for FIGS. 22 and 23. Image compensation as described is essentially converting the image for either direct viewing or reflected viewing. The portable computer in FIG. 52 is equipped for videoconferencing including the speaker 55 and a microphone 273. The a direct view image 288 is standard in all consumer display products. The present invention requires an additional image display capability as seen in FIG. 53. Here the conferee has selected with a image switch 286 a converted image 290 for viewing upon the reflection on the beamsplitter 6 as seen in FIGS. 50 and 51. Instead of the image switch 286, the image conversion can occur automatically when tilting the portable display 270 backward or image conversion can be engaged through software. Any method for image conversion is applicable to the present invention including manipulation of the image signal by software, hardware, including a video/graphics board, or any combination thereof. Also image conversion can be achieved by changing signal wires and changing a display's circuitry. Image conversion as well can be achieved by using a second mirror in an optical arrangement so that the reflected image on the beamsplitter 6 can be viewed correctly. Another novel method of image converting can be seen FIG. 54 where a transmissive display 292, such as an AMLCD, can be removed from a backlight 271 and flipped over setting back on top of the backlight 271. A flipping support arm 294 and flip pivot hinges 296 are used optionally to support the transmissive display 292 as it is turned over.

Figure 55:
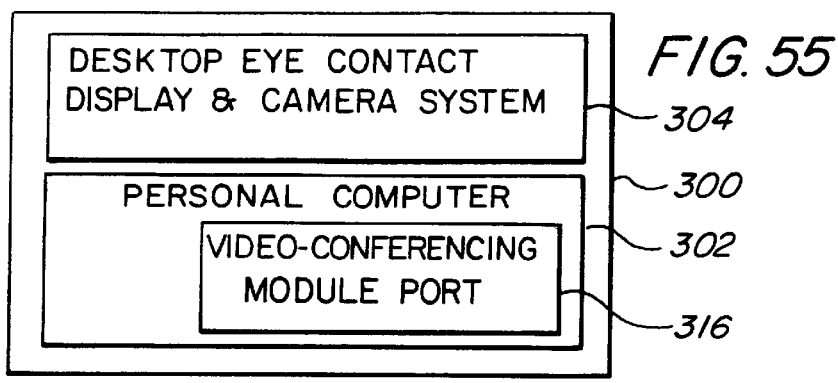
FIG. 55 illustrates a block diagram of an integrated eye contact computer with a module port.

A primary embodiment of the present invention is a creation of a single desktop system designed around the parameters of high quality video production for effective communication which includes eye contact and computer system flexible enough to adapt to changing transmission systems. Videoconferencing is as good as the bandwidth pipe and compression it utilizes. Ideally videoconferencing is experienced real-time with no lag between audio and video and the image looks as good as television. The consumer is wary of an investment in a technology that may be obsolete within a year. FIG. 55 illustrates a block diagram of the present invention of an integrated eye contact computer 300 which functionally incorporates a personal computer 302 with a videoconferencing module port 316 and a desktop eye contact display and camera system 304. The module port 316 permits quick replacement of the videoconferencing system by the consumer.

Figure 56:
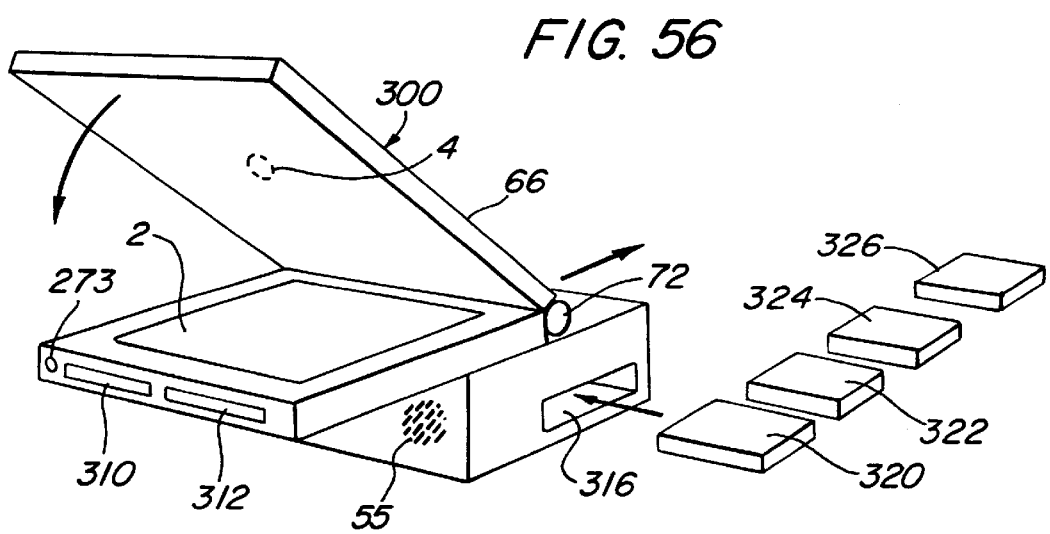
FIG. 56 illustrates an integrated eye contact computer with replaceable modules.

FIG. 56 illustrates an integrated eye contact computer 300 that incorporates a fully functioning personal computer for processing, storing, and transferring data, and a display 2 with beamsplitter terminal section 66 for eye contact videoconferencing. The integrated eye contact computer as well includes the videoconferencing module port 316 so that the consumer can utilize the latest transmission system and readily exchange a "LAN module" 320, for a "128 module" 322, or a "384 module" 324, or a "T1 module" 326. The modules described are for specific transmission systems, however a single module may contain one or more compression and/or connection methods which include any and all proprietary and public videoconferencing transmission systems including data and analog systems. It may include as well an accelerator for a software based videoconferencing system such as Microsoft Corporation's Net Meeting™.

Figure 57:
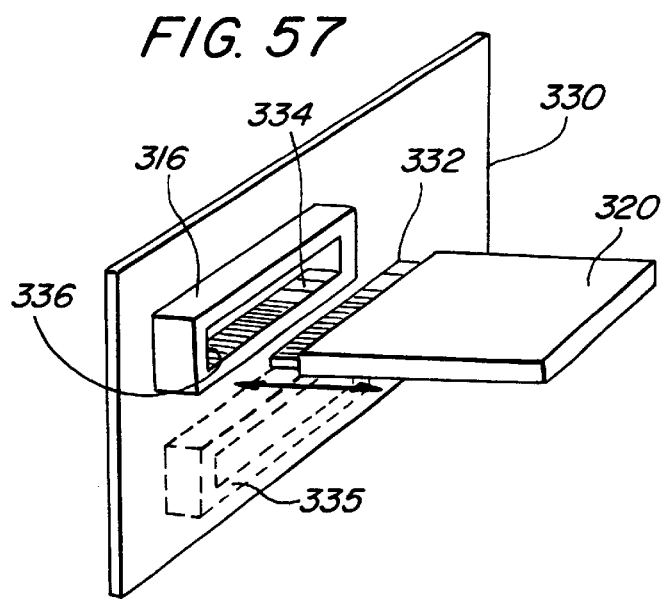
FIG. 57 illustrates a back plane with a fabricated module port.

The videoconferencing module port 316 permits the integrated eye contact computer to be flexible enough to adapt to new videoconferencing systems including wireless. Also, the videoconferencing module port 316 permits the consumer to quickly exchange modules for different types of connections. The videoconferencing module port 316 is attached to a back plane 330 and includes contact connections 334 which receive the LAN module 320 contact connections as seen in FIG. 57. Of course a module of any specific videoconferencing system is applicable. While PCI or ISA slots accessible from inside an integrated eye contact computer housing 308 may suffice, it is specifically illustrated that the videoconferencing module port 316 be accessible from the exterior of the integrated eye contact computer housing 308 for ease of use by the consumer. Preferably the modules are compact in size and encased in a plastic shell for ease of portability. An additional videoconferencing module port 335 may also be included so that each module may have dedicated functions such as one module used for multiplexing phone lines while another for data/image compression.

Figure 58:
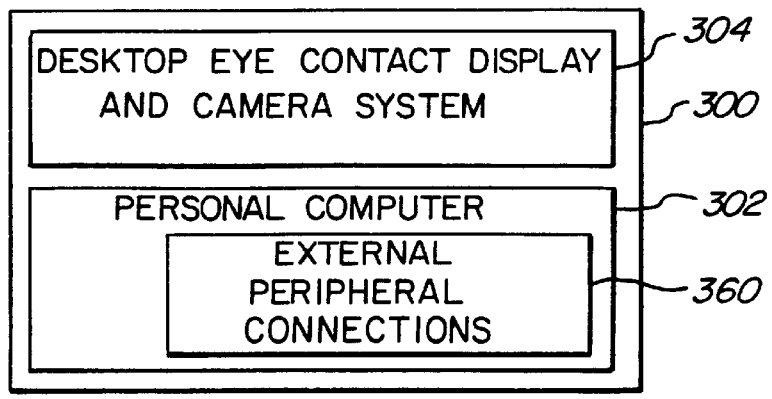
FIG. 58 illustrates a block diagram of an integrated eye contact computer that serves both as a single user desktop system and as a group conferencing system.

The integrated eye contact computer 300 is configured specifically to enable the highest quality single user videoconferencing experience in a single fully integrated device. The unique features of this device including the folding beamsplitter section 66 and the inclusion of computer for videoconferencing applications also enables this single device to be used for group conferencing. For example, a consumer may utilize the integrated eye contact computer 300 as his sole desktop computer but may also desire, at times, to conduct group videoconferencing. Instead of the consumer being forced to acquire two complete systems, the present invention is essentially two systems in one. The display 2 is generally too small to conduct such group sessions. A block diagram seen in FIG. 58 illustrates this multi-applicational device explained here as the integrated eye contact computer 300 which includes a desktop eye contact display and camera system 304, a fully functional personal computer 302 and a peripheral connections 360.

Figure 59:
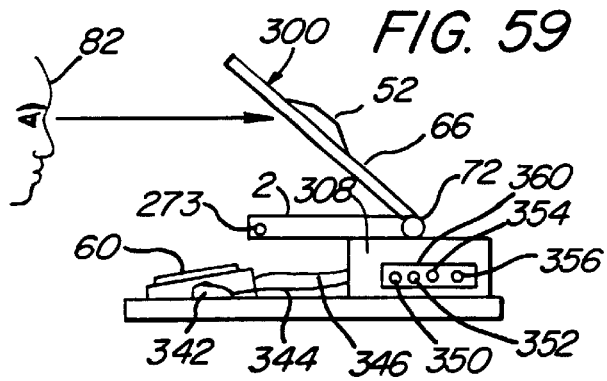
FIG. 59 illustrates an integrated eye contact computer with peripheral connection used in a single user mode.

FIG. 59 illustrates the present invention in a typical single user form factor and includes the peripheral connections 360. A mouse 342 and the keyboard 60 are connected to the integrated eye contact computer 300 by a mouse line 344 and a keyboard line 346. The inclusion of the peripheral connections 360 with an external microphone connection 352, an external speaker connection 356, an external camera connection 354, and an external monitor connection 350 all permit group conferencing with peripheral components. The integrated eye contact computer 300 is small enough to be portable so that the consumer can quickly remove it from a desk space and set up in a group space. A battery pack can also be included for additional portability.

Figure 60:
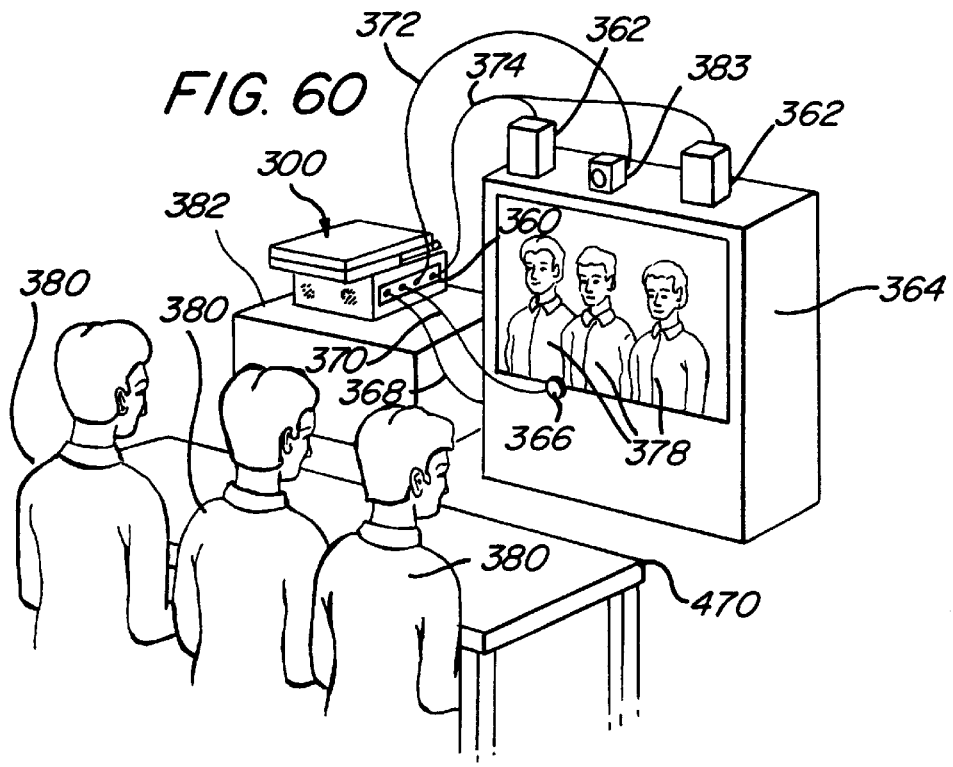
FIG. 60 illustrates an integrated eye contact computer with peripheral connections used for group videoconferencing.

FIG. 60 illustrates the integrated eye contact computer 300 with the peripheral connections 360 utilized in group conferencing mode. Local conference participants 380 observe distant conference participants 378 on a large screen display 364. An external microphone 366, an external speakers 362, and an external camera 383, and the large screen display 364 are all connected to the integrated eye contact computer 300 for operation during the videoconference. The distant participants may as well have the same computer or may have a traditional group system. A speaker line 374, a camera line 372, a monitor line 368, and a microphone line 370 connect the peripherals with the integrated eye contact computer 300. The integrated eye contact computer 300 is shown resting on a side table 382 but may be on the group table 470 and used during the group conference to control aspects of the conference such as document sharing or multipoint applications. In such a case the display 2 may display an image different than what is seen on the large screen display 364. The peripheral connection 360 may also be in part or entirely wireless to avoid laying out cable.

FIG. 61 illustrates the same positional function as described in FIG. 20 which is incorporated into the integrated eye contact computer 300. FIG. 62 illustrates an alternate positioning system that deploys a horizontal track 384 which permits the display 2 to slide back along with the beamsplitter terminal section 66 so that neither overhang the keyboard 60 and the essential work area 78 as seen in FIG. 63. The beamsplitter terminal section 66 and the display 2 when integrated into variations of the integrated eye contact computer 300 can slide back as seen in FIG. 64. FIG. 65 is essentially the same as FIG. 24 and further illustrates the display 2 and the beamsplitter terminal section 66 folded upon one another and parallel to the conferee opening up the essential work area 78. In this embodiment the display 2 and the beamsplitter terminal section are on a vertical track 386 so they can be lowered.

A significant aspect of the present invention is to create in one device a complete production studio on the desktop in the same space commonly utilized by the consumer for a personal computer. The integrated eye contact computer 300 is also applicable to other inferior, yet still relevant, eye contact display systems. These display systems as well benefit from an integrated approach that incorporates a personal computer with, as it relates to the present invention, a module port 316 for receiving videoconferencing modules as described and also configured with peripheral connections so that the terminal can be used for two modes: 1) A self contained single user mode, and 2) a group conferencing mode requiring additional components including an external microphone 366, external speakers 362, and a large screen display 364, and an external camera 383 .

FIG. 66 illustrates the present invention of an integrated eye contact computer 300 with an eye contact transmissive display 390 in which an eye contact image is captured through the display 390 by the camera 4. Refinements to this fundamental eye contact system are all applicable. FIG. 67 illustrates a rear projection eye contact system of which a projection screen 394 is both transmissive for capturing eye contact images and also diffused for dispersing a projected image from a projector 392. This rear projection system can be configured as a consumer rear projection TV that is both analog and digital. FIG. 68 illustrates a camera view reflection eye contact arrangement with an ambient light shield 396 and a second ambient light shield 398. These fundamental eye contact technologies and their various refinements of FIGS. 66, 67, and 68, as well as other eye contact technologies, such as animating the direction of the eyes in real-time, benefits from the present inventions embodiments. This includes the videoconferencing module port 316 as well as the dual mode configuration as a single user terminal and a group videoconferencing system utilizing peripheral connections 340.

Figure 69:
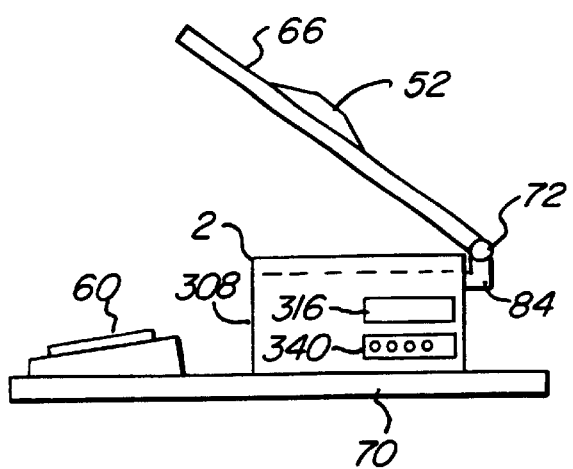
FIG. 69 illustrates a display built as a part of a personal computer and not forming a canopy over the desktop.
Figure 71:
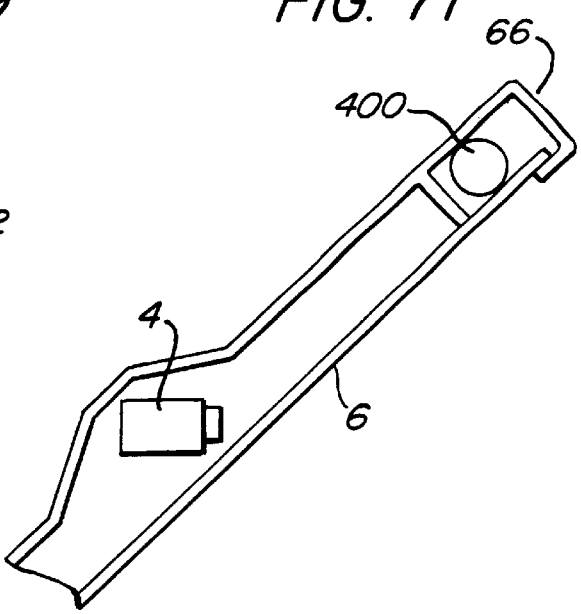
FIG. 71 illustrates a light concealed behind the beamsplitter.
Figure 70:
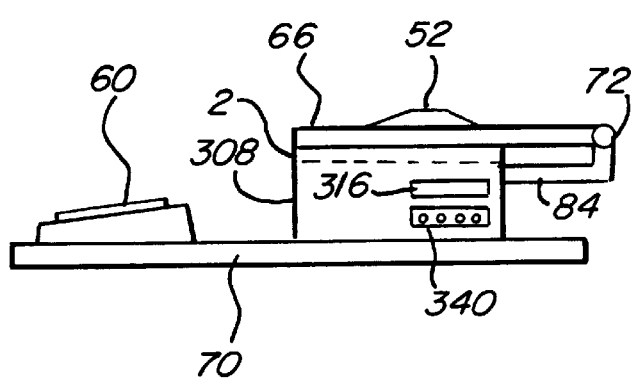
FIG. 70 illustrates a beamsplitter positioned away from a keyboard area when closed.
Figure 72:
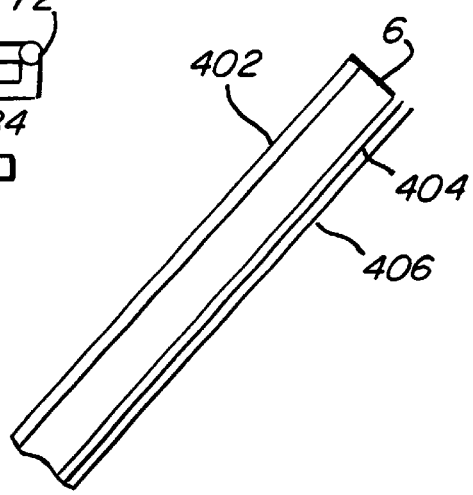
FIG. 72 illustrates an antireflective coating and a hard coat to protect the reflective coating.

FIG. 69 illustrates another configuration of the present invention where the display 2 is built into the integrated eye contact computer housing 300. In this configuration, the display 2 faces upward but it does not form a canopy over the desktop. The beamsplitter terminal section 66 when folded down will still cover the keyboard 60. FIG. 70 illustrates the embodiment of FIG. 69 where the beamsplitter terminal section 66 is positioned rearward as described for FIG. 20. FIG. 71 illustrates a concealed light behind the beamsplitter 6. Thin tube light 400 is preferably a dimmable color corrected florescent tube for illuminating the conferee. Certainly as consumers become accustomed to an integrated eye contact computer 300 additional video production elements can be included such as blue screens and other realtime visual effects.

A further embodiment of the present invention is the addition of a hard coat 406, such as clear polymer that is coated directly over the beamsplitter coating 404. In consumer applications, the durability of the beamsplitter coating 404 is of great importance. Many high-quality metallic coatings cannot withstand rubbing and scratch tests. The hard coat 406 assures extended life of the beamsplitter 6. On the rear side of the beamsplitter 6, an anti-reflective coating may be optionally deployed to reduce unwanted reflections. Likewise, the hard coat 406 can be layered on top of the anti-reflective coating 402 for protection (not shown).

Often while document sharing during a videoconference, the window displaying the remote conferee is reduced in size and moved to a corner of the image. Repositioning manually the camera into preselected sections in a supporting housing will serve adequately to maintain eye contact. Also elaborate camera movement systems can be used to relocate the camera to various positions behind the beamsplitter.

Various mechanisms have been explored for camera positioning and camera aiming. Motorized positioning and aiming systems have been developed to allow remote control of the camera. Also, autotracking systems permit the camera to follow the conferee as he or she moves about. The camera 4 can also be attached directly to the beamsplitter 6. When mounting the camera 4 to the beamsplitter 6 as seen in FIG. 12, the camera 4 aiming direction can operate independent of the positioning of the beamsplitter 6 such as in FIG. 11. Camera 4 can also be mounted in a position not directly behind the beamsplitter 6. In such a case mirrors or an image conduit can redirect the image passing through the beamsplitter 6 to the camera 4.

Additional teleconferencing components may be included as desired in terminals configured with the present invention. The camera 4 can be configured as a small detachable camcorder and thereby add the economy of serving multiple purposes. The camera 4 may, as well, be configured with remote controls. Lights can also be added as desired to enhance image capture quality. Lights may also be placed behind the beamsplitter 6 so long as they do not interfere with the display 2 image reflection. Microphones can be integrated into various terminal configurations with the present invention. Like the speakers 55 the microphones can advantageously aimed so that sound bounces off the beamsplitter 6. The addition of optical coatings, such as CRT radiation reduction filters, color filters and contrasts, and glare guard technologies, may be added as well. Also, 3-D displays and fresnel lenses that expand the size of the display image will readily integrate with this invention. Other modifications will be apparent as new teleconferencing, video camera, computer, and display technology transforms during this time of global teleconmmunication transition.

Of course, the teleconferencing terminal used as part of the current invention can be, and preferably is, a multipurpose personal computer running a graphical interface program such as Windows 95®. Therefore, the graphical interface can be used to place calls, select views, etc. That is, if a conference call is undertaken between several conferees, the various conferees can be displayed in separate windows on the screen. One particular conferee can be selected to occupy the entire display 2 by choosing the conferee's window using a keyboard, a mouse, a touch screen, or similar user input means.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An integrated eye contact teleconferencing terminal for allowing a first conferee to maintain eye contact with a second conferee imaged by the teleconferencing terminal, the teleconferencing terminal comprising:
   a substantially planar image display, with an image bearing surface facing upward;
   a semireflective transparent panel forming an angle of between about 30 and 60 degrees with the image display for viewing by the first conferee a reflection of the image bearing surface of the image display on the semireflective transparent panel;
   a video camera disposed on a side of the semireflective transparent panel opposite the image display, the video camera capturing, through the semireflective transparent panel, an image of the first conferee who is disposed on the image display-side of the semireflective transparent panel;
   a connecting mechanism means so that the semireflective transparent panel and the image display can be closed upon one another; and
   a positioning mechanism means so that the semireflective transparent panel, while closed upon the image display, does not substantially overhang a keyboard area between the first conferee and the image display.

2. The teleconferencing terminal of claim 1 wherein a layer of image blocking film is disposed between the image bearing surface of the image display and the semireflective transparent panel blocking a direct view of the image bearing surface from the first conferee viewing the reflection of the image bearing surface on the semireflective transparent panel.

3. The teleconferencing terminal of claim 1 further comprising a personal computer for at least processing, storing and transferring digital information and enabling a visual and auditory videoconference.

4. The teleconferencing terminal of claim 3 wherein the terminal is portable.

5. An integrated eye contact teleconferencing terminal for allowing a first conferee to maintain eye contact with a second conferee imaged by the teleconferencing terminal, the teleconferencing terminal comprising:

a substantially planar image display;

a semireflective transparent panel forming an angle of between about 30 and 60 degrees with the image display for viewing by the first conferee a reflection of an image bearing surface of the image display on the semireflective transparent panel;

a video camera disposed on a side of the semireflective transparent panel opposite the image display, the video camera capturing, through the semireflective transparent panel, an image of the first conferee who is disposed on the image display-side of the semireflective transparent panel;

a selectable viewing mode of the image bearing surface so that the first conferee may observe the image bearing surface either directly or as the reflection on the semireflective transparent panel; and an image converting means so that an image formed upon the image bearing surface is observably the same by the first conferee when viewing the image bearing surface directly and when reflected by the semireflective transparent panel.

6. The teleconferencing terminal of claim 5 wherein a layer of image blocking film is disposed between the image bearing surface of the image display and the semireflective transparent panel blocking a direct view of the image bearing surface from the first conferee viewing the reflection of the image bearing surface on the semireflective transparent panel.

7. The teleconferencing terminal of claim 5 wherein the image converting means is produced by one or more of turning an LCD panel over and positioned upon a backlight, an image signal change through computer hardware, an image signal change through computer software, and changing the image signal at the display circuitry.

8. The teleconferencing terminal of claim 5 wherein the first conferee can select the image converting means for either direct view or reflected view.

9. The teleconferencing terminal of claim 5 wherein the image converting means is engaged automatically when positioning the image display.

10. The teleconferencing terminal of claim 5 further comprising a personal computer for at least processing, storing and transferring digital information and enabling a visual and auditory videoconference.

11. The teleconferencing terminal of claim 5 wherein the semireflective transparent panel is separate from the image display.

12. An integrated eye contact teleconferencing terminal for allowing a first conferee to maintain eye contact with a second conferee imaged by the teleconferencing terminal, the teleconferencing terminal comprising:

a substantially planar image display connectably fabricated as a part of a portable personal computer;

a semireflective transparent panel separate from the image display forming an angle of between about 30 and 60 degrees with the image display for viewing by the first conferee a reflection of an image bearing surface of the image display on the semireflective transparent panel;

a video camera separate from the image display disposed on a side of the semireflective transparent panel opposite the image display, the video camera capturing, through the semireflective transparent panel, an image of the first conferee who is disposed on the image display-side of the semireflective transparent panel;

a selectable viewing mode of the image bearing surface so that the first conferee may observe the image bearing surface either directly or as the reflection on the semireflective transparent panel; and an image converting means so that an image formed upon the image bearing surface is observably the same by the first conferee when viewing the image bearing surface directly and when reflected by the semireflective transparent panel.

13. The teleconferencing terminal of claim 12 wherein a layer of image blocking film is disposed between the image bearing surface of the image display and the semireflective transparent panel blocking a direct view of the image bearing surface from the first conferee viewing the reflection of the image bearing surface on the semireflective transparent panel.

14. The teleconferencing terminal of claim 12 wherein the image converting means is produced by one or more of turning an LCD panel over and positioned upon a backlight, an image signal change through computer hardware, an image signal change through computer software, and changing the signal at the display circuitry.

15. The teleconferencing terminal of claim 12 wherein the first conferee can select the image converting means for either direct view or reflected view.

16. The teleconferencing terminal of claim 12 wherein the image converting means is engaged automatically when positioning the image display.

17. The teleconferencing terminal of claim 12 wherein the image display detaches from the portable personal computer and positioned at adjustable heights to the semireflective transparent panel.

18. An integrated eye contact teleconferencing terminal for allowing a first conferee to maintain eye contact with a second conferee imaged by the teleconferencing terminal, the teleconferencing terminal comprising:

a substantially planar image display connectably fabricated as a part of a portable personal computer;

a semireflective transparent panel forming an angle of between about 30 and 60 degrees with the image display for viewing by the first conferee a reflection of an image bearing surface of the image display on the semireflective transparent panel;

a video camera disposed on a side of the semireflective transparent panel opposite the image display, the video camera capturing, through the semireflective transparent panel, an image of the first conferee who is disposed on the image display-side of the semireflective transparent panel;

a selectable viewing mode of the image bearing surface so that the first conferee may observe the image bearing surface either directly or as the reflection on the semireflective transparent panel; and an image converting means so that an image formed upon the image bearing surface is observably the same by the first conferee when viewing the image bearing surface directly and when reflected by the semireflective transparent panel.

19. The teleconferencing terminal of claim 18 wherein a layer of image blocking film is disposed between the image bearing surface of the image display and the semireflective transparent panel blocking a direct view of the image bearing surface from the first conferee viewing the reflection of the image bearing surface on the semireflective transparent panel.

20. The teleconferencing terminal of claim 18 wherein the image converting means is produced by one or more of turning an LCD panel over and positioned upon a backlight, an image signal change through computer hardware, an image signal change through computer software, and changing the signal at the display circuitry.

21. The teleconferencing terminal of claim 18 wherein the first conferee can select the image converting means for either direct view or reflected view.

22. The teleconferencing terminal of claim 18 wherein the image converting means is engaged automatically when positioning the image display.

23. The teleconferencing terminal of claim 18 wherein the image display detaches from the portable personal computer and positioned at adjustable heights to the semireflective transparent panel.

24. The teleconferencing system of claim 18 wherein the semireflective transparent panel can separate from the portable personal computer.

25. The teleconferencing system of claim 18 wherein the semireflective transparent panel is configurable to store on the opposite side of the image display when not in use.

26. An integrated eye contact teleconferencing terminal for allowing a first conferee to maintain eye contact with a second conferee imaged by the teleconferencing terminal, the teleconferencing terminal comprising:
   a substantially planar image display;
   a semireflective transparent panel forming an angle of between about 30 and 60 degrees with the image display for viewing by the first conferee a reflection of an image bearing surface of the image display on the semireflective transparent panel;
   a video camera disposed on a side of the semireflective transparent panel opposite the image display, the video camera capturing, through the semireflective transparent panel, an image of the first conferee who is disposed on the image display-side of the semireflective transparent panel; and
   a selectable shutter means for permitting the first conferee to select between a clear mode for observation through and beyond the semireflective transparent panel and an opaque mode for enhancing contrast of the reflection of the image bearing surface on the semireflective panel.

27. The teleconferencing terminal of claim 12 wherein a layer of image blocking film is disposed between the image bearing surface of the image display and the semireflective transparent panel blocking a direct view of the image bearing surface from the first conferee viewing the reflection of the image bearing surface on the semireflective transparent panel.

28. The teleconferencing terminal of claim 26 wherein the shutter means is provided from the grouping of an LCD panel switchable between a clear mode and an opaque mode, arranging polarizers so that in one position they are clear and in another position they are opaque, a solid removable opaque layer for either clear or opaque modes, and a fluid shutter.

29. The teleconferencing terminal of claim 26 wherein the semireflective transparent panel and the shutter means are separate from the image display.

30. The teleconferencing terminal of claim 26 further comprising a personal computer for at least processing, storing and transferring digital information and enabling a visual and auditory videoconference.

31. An improved eye contact teleconferencing terminal for allowing a first conferee to maintain eye contact with a second conferee imaged by the teleconferencing terminal, the teleconferencing terminal comprising:
   a substantially planar image display, with an image bearing surface facing upward, forming a canopy above a desktop;
   a semireflective transparent panel forming an angle of between about 30 and 60 degrees with the image display for viewing by the first conferee a reflection of the image bearing surface of the image display on the semireflective transparent panel;
   a video camera disposed on a side of the semireflective transparent panel opposite the image display, the video camera capturing, through the semireflective transparent panel, an image of the first conferee who is disposed on the image display-side of the semireflective transparent panel;
   a connecting mechanism means so that the semireflective transparent panel and the image display can be closed upon one another;
   a positioning mechanism means so that the semireflective transparent panel, while closed upon the image display, does not substantially overhang a keyboard area between the first conferee and the image display;
   a personal computer for at least processing, storing and transferring digital information; and
   a module port for receiving a videoconferencing module that functionally operates as apart of the personal computer to enable a videoconference between the first and second conferees.

32. The teleconferencing terminal of claim 31 where in a layer of image blocking film is disposed between the image bearing surface of the image display and the semireflective transparent panel blocking a direct view of the image bearing surface from the first conferee viewing the reflection of the image bearing surface on the semireflective transparent panel.

33. The teleconferencing terminal of claim 31 wherein the videoconferencing module is configured for transmitting data by one or more of a local area network, wide area network, Internet, ISDN, multiple phone lines, T1, wire less, and proprietary and public transmission schemes.

34. The teleconferencing terminal of claim 31 further comprising additional module ports for additional videoconferencing modules necessary to enable a videoconference.

35. The teleconferencing terminal of claim 31, wherein the videoconferencing module enables auditory interaction between the first and second conferees.

36. The teleconferencing terminal of claim 31 further comprising a microphone, a speaker, a light, a removable digital storage, a CD ROM, a DVD ROM, a removable camera, and a human interface hardware.

37. An integrated eye contact teleconferencing terminal for allowing a first conferee to maintain eye contact with a second conferee imaged by the teleconferencing terminal, the teleconferencing terminal comprising:
   a substantially planar image display;
   a semireflective transparent panel forming an angle of between about 30 and 60 degrees with the image display for viewing by the first conferee a reflection of an image bearing surface of the image display on the semireflective transparent panel;
   a video camera disposed on a side of the semireflective transparent panel opposite the image display, the video camera capturing, through the semireflective transparent panel, an image of the first conferee who is disposed on the image display-side of the semireflective transparent panel;
   a personal computer for at least processing, storing and transferring digital information; and
   a module port for receiving a videoconferencing module that functionally operates as a part of the personal computer to enable a videoconference between the first and second conferees.

38. The teleconferencing terminal of claim 37, wherein a layer of image blocking film is disposed between the image bearing surface of the image display and the semireflective transparent panel blocking a direct view of the image bearing surface from the first conferee viewing the reflection of the image bearing surface on the semireflective transparent panel.

39. The teleconferencing terminal of claim 37, wherein the videoconferencing module is configured for transmitting data by one or more of a local area network, wide area network, Internet, ISDN, multiple phone lines, T1, wireless, and proprietary and public transmission schemes.

40. The teleconferencing terminal of claim 37 further comprising additional module ports for additional videoconferencing modules necessary to enable a videoconference.

41. The teleconferencing terminal of claim 37, wherein the videoconferencing module enables auditory interaction between the first and second conferees.

42. The teleconferencing terminal of claim 37 further comprising a microphone, a speaker, a light, a removable digital storage, a CD ROM, a DVD ROM, a removable camera, and a human interface hardware.

43. An integrated eye contact teleconferencing terminal for allowing a first conferee to maintain eye contact with a second conferee imaged by the teleconferencing terminal, the teleconferencing terminal comprising:

a substantially planar image display displaying the image of a second conferee;

a camera for capturing an image of the first conferee for transmission to and observation by the second conferee;

eye contact means so that the image captured of the first conferee, while observing the second conferee's image produced upon the image display, is received by the second conferee as looking straight ahead and into the eyes of the second conferee;

a personal computer for at least processing, storing and transferring digital information; and a module port for receiving a videoconferencing module that functionally operates as a part of the personal computer to enable a videoconference between the first and second conferees.

44. The teleconferencing terminal of claim 43, wherein a layer of image blocking film is disposed between the image bearing surface of the image display and the semireflective transparent panel blocking a direct view of the image bearing surface from the first conferee viewing the reflection of the image bearing surface on the semireflective transparent panel.

45. The teleconferencing terminal of claim 43, wherein the videoconferencing module is configured for transmitting data by one or more of a local area network, wide area network, Internet, ISDN, multiple phone lines, T1, wireless, and proprietary and public transmission schemes.

46. The teleconferencing terminal of claim 43 further comprising additional module ports for additional videoconferencing modules necessary to enable a videoconference.

47. The teleconferencing terminal of claim 43, wherein the videoconferencing module enables auditory interaction between the first and second conferees.

48. The teleconferencing terminal of claim 43 further comprising a microphone, a speaker, a light, a removable digital storage, a CD ROM, a DVD ROM, a removable camera, and a human interface hardware.

49. An improved eye contact teleconferencing terminal for allowing a first conferee to maintain eye contact with a second conferee imaged by the teleconferencing terminal, the teleconferencing terminal comprising:

a substantially planar image display, with an image bearing surface facing upward, forming a canopy above a desktop;

a semireflective transparent panel forming an angle of between about 30 and 60 degrees with the image display for viewing by the first conferee a reflection of the image bearing surface of the image display on the semireflective transparent panel;

a video camera disposed on a side of the semireflective transparent panel opposite the image display, the video camera capturing, through the semireflective transparent panel, an image of the first conferee who is disposed on the image display-side of the semireflective transparent panel;

a connecting mechanism means so that the semireflective transparent panel and the image display can be closed upon one another;

a positioning mechanism means so that the semireflective transparent panel, while closed upon the image display, does not substantially overhang a keyboard area between the first conferee and the image display.

a personal computer for at least processing, storing and transferring digital information and enable a visual and auditory videoconference; and a peripheral connection means for enabling at least a separate display, speaker and microphone to operate from the personal computer so that the terminal can be utilized for group videoconferencing involving multiple participants.

50. The teleconferencing terminal of claim 49 wherein a layer of image blocking film is disposed between the image bearing surface of the image display and the semireflective transparent panel blocking a direct view of the image bearing surface from the first conferee viewing the reflection of the image bearing surface on the semireflective transparent panel.

51. The teleconferencing terminal of claim 49 further comprising a microphone, a speaker, a light, a removable digital storage, a CD ROM, a DVD ROM, a removable camera, and a human interface hardware.

52. An integrated eye contact teleconferencing terminal for allowing a first conferee to maintain eye contact with a second conferee imaged by the teleconferencing terminal, the teleconferencing terminal comprising:

a substantially planar image display;

a semireflective transparent panel forming an angle of between about 30 and 60 degrees with the image display for viewing by the first conferee a reflection of an image bearing surface of the image display on the semireflective transparent panel;

a video camera disposed on a side of the semireflective transparent panel opposite the image display, the video camera capturing, through the semireflective transparent panel, an image of the first conferee who is disposed on the image display-side of the semireflective transparent panel;

a personal computer for at least processing, storing and transferring digital information and enable a visual and auditory videoconference; and a peripheral connection means to enable at least a separate display, speaker and microphone to operate from the personal computer so that the terminal can be utilized for group videoconferencing involving multiple participants.

53. The teleconferencing terminal of claim 52 wherein a layer of image blocking film is disposed between the image bearing surface of the image display and the semireflective transparent panel blocking a direct view of the image bearing surface from the first conferee viewing the reflection of the image bearing surface on the semireflective transparent panel.

54. The teleconferencing terminal of claim 52 further comprising a microphone, a speaker, a light, a removable digital storage, a CD ROM, a DVD ROM, a removable camera, and a human interface hardware.

55. An integrated desktop eye contact teleconferencing terminal for allowing a first conferee to maintain eye contact with a second conferee imaged by the teleconferencing terminal, the teleconferencing terminal comprising:

a substantially planar image display displaying the image of a second conferee;

a camera for capturing an image of the first conferee for transmission to and observation by the second conferee;

eye contact means so that the image captured of the first conferee, while observing the second conferee's image produced upon the image display, is received by the second conferee as looking straight ahead and into the eyes of the second conferee;

a personal computer for at least processing, storing and transferring digital information and enable a visual and auditory videoconference; and a peripheral connection means to enable at least a separate display, speaker and microphone to operate from the personal computer so that the terminal can be utilized for group videoconferencing involving multiple participants.

56. The teleconferencing terminal of claim 55 wherein a layer of image blocking film is disposed between the image bearing surface of the image display and the semireflective transparent panel blocking a direct view of the image bearing surface from the first conferee viewing the reflection of the image bearing surface on the semireflective transparent panel.

57. The teleconferencing terminal of claim 55 further comprising a microphone, a speaker, a light, a removable digital storage, a CD ROM, a DVD ROM, a removable camera, and a human interface hardware.

58. An integrated eye contact teleconferencing terminal for allowing a first conferee to maintain eye contact with a second conferee imaged by the teleconferencing terminal, the teleconferencing terminal comprising:

a substantially planar image display;

a semireflective transparent panel forming an angle of between about 30 and 60 degrees with the image display for viewing by the first conferee a reflection of an image bearing surface of the image display on the semireflective transparent panel;

a video camera disposed on a side of the semireflective transparent panel opposite the image display, the video camera capturing, through the semireflective transparent panel, an image of the first conferee who is disposed on the image display-side of the semireflective transparent panel; and a protection means to protect a reflective coating upon the semireflective transparent panel.

59. The teleconferencing terminal of claim 58 wherein the protection means is a polymer hard coating.

60. An integrated eye contact teleconferencing terminal for allowing a first conferee to maintain eye contact with a second conferee imaged by the teleconferencing terminal, the teleconferencing terminal comprising:

a substantially planar image display;

a semireflective transparent panel forming an angle of between about 30 and 60 degrees with the image display for viewing by the first conferee a reflection of an image bearing surface of the image display on the semireflective transparent panel;

a video camera disposed on a side of the semireflective transparent panel opposite the image display, the video camera capturing, through the semireflective transparent panel, an image of the first conferee who is disposed on the image display-side of the semireflective transparent panel; and a remote camera positioning system for at least one of panning, tilting and zooming the camera.

61. The teleconferencing terminal of claim 60 wherein at least one of the first conferee and the second conferee can remotely control the camera.

* * * * *

UNITED STATES PATENT AND TRADEMARK OFFICE
CERTIFICATE OF CORRECTION

PATENT NO. : 6,243,130 B1 Page 1 of 1
DATED : June 5, 2001
INVENTOR(S) : McNelley et al.

It is certified that error appears in the above-identified patent and that said Letters Patent is hereby corrected as shown below:

<u>Title page,</u>
Item [63], change "09/107,476" to -- 09/108,476 --.

Signed and Sealed this

Fifth Day of November, 2002

*Attest:*

*Attesting Officer*

JAMES E. ROGAN
*Director of the United States Patent and Trademark Office*